US009179485B2

(12) United States Patent
Stephens et al.

(10) Patent No.: US 9,179,485 B2
(45) Date of Patent: Nov. 3, 2015

(54) METHODS AND APPARATUS FOR ASSOCIATING USER EQUIPMENT ELECTRONIC IDENTIFIERS WITH USERS

(75) Inventors: Arthur Stephens, Georgetown, TX (US); Zhibin Wu, Bedminster, NJ (US); Pierre-Julien Bringer, Montesson (FR)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 13/551,479

(22) Filed: Jul. 17, 2012

(65) Prior Publication Data

US 2014/0022999 A1    Jan. 23, 2014

(51) Int. Cl.
| | |
|---|---|
| H04L 12/28 | (2006.01) |
| H04W 76/02 | (2009.01) |
| H04W 28/04 | (2009.01) |
| H04W 72/04 | (2009.01) |
| H04L 29/06 | (2006.01) |
| H04W 12/06 | (2009.01) |
| H04J 1/16 | (2006.01) |
| H04L 5/00 | (2006.01) |

(52) U.S. Cl.
CPC .............. *H04W 76/023* (2013.01); *H04L 63/08* (2013.01); *H04W 12/06* (2013.01); *H04W 28/04* (2013.01); *H04W 72/04* (2013.01); *H04L 5/0007* (2013.01)

(58) Field of Classification Search
CPC ..... H04W 28/04; H04W 72/04; H04L 5/0007
USPC .................................. 370/252, 329, 338, 386
See application file for complete search history.

(56) References Cited

U.S. PATENT DOCUMENTS

| | | | |
|---|---|---|---|
| 2006/0271619 A1 | 11/2006 | Nurminen et al. | |
| 2008/0125041 A1 | 5/2008 | Angelhag et al. | |
| 2009/0186577 A1 | 7/2009 | Ross et al. | |
| 2009/0195402 A1 | 8/2009 | Izadi et al. | |
| 2009/0323647 A1 | 12/2009 | Park et al. | |
| 2009/0327391 A1 | 12/2009 | Park et al. | |
| 2010/0063889 A1 | 3/2010 | Proctor, Jr. et al. | |
| 2010/0299522 A1 | 11/2010 | Khambete | |
| 2011/0228666 A1* | 9/2011 | Barbieri et al. ................ | 370/216 |
| 2011/0258313 A1* | 10/2011 | Mallik et al. .................. | 709/224 |
| 2013/0222133 A1* | 8/2013 | Schultz et al. ........... | 340/539.13 |

OTHER PUBLICATIONS

Anonymous: "Caller ID—Wikipedia, the free encyclopedia", Jul. 12, 2012, XP055136294, Retrieved from the Internet: URL:http://en.wikipedia.org/w/index.php? title=Caller_ID&oldid=501891519, [retrieved on Aug. 25, 2014], pp. 1-13.
International Search Report and Written Opinion—PCT/US2013/050809—ISA/EPO—Oct. 17, 2013.

\* cited by examiner

*Primary Examiner* — John Pezzlo
(74) *Attorney, Agent, or Firm* — James K. O'Hare

(57) ABSTRACT

Techniques for associating an electronic identifier of a user equipment (UE) with a user of the UE are described. In embodiments of an apparatus, system, method, and computer program of the present disclosure, a UE may transmit an electronic identifier associated with the UE via peer discovery, for receiving by a second UE. A perceivable cue associated with the electronic identifier may be indicated to a second user. The UE or the user of the UE may indicate the perceivable cue to the second user. Selection of the perceivable cue by the second user may cause the initiation of communications between the UE and the second UE.

50 Claims, 18 Drawing Sheets

METHODS AND APPARATUS FOR ASSOCIATING USER EQUIPMENT ELECTRONIC IDENTIFIERS WITH USERS

BACKGROUND

I. Field

The present disclosure relates generally to telecommunications, and more specifically to techniques for associating user equipment (UE) electronic identifiers with a user of the UE.

II. Background

Wireless communication networks are widely deployed to provide various types of communication content, such as voice, video, packet data, messaging, broadcast, etc. Wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. A wireless communication network may also be referred to as a wide area network (WAN).

A wireless communication network may include a number of network communications hubs (also referred to as evolved node Bs, eNBs, or access nodes) that can support communication for a number of user equipments (UEs). In a WAN, communication by and between UEs typically occurs at the request of at least one of the UEs via uplink/downlink channels between the UEs and a network communications hub. A UE is thus enabled to communicate with a network communications hub. Also, if two UEs are in the vicinity of each other, they may be enabled to communicate directly, that is, without communicating through the network communications hub. A UE may thus be enabled to communicate peer-to-peer (P2P), also referred to as device-to-device (D2D), with one or more other UEs.

More particularly, often times in public environments (e.g., social events or gatherings), two people within a line of sight (or line of acknowledgement) of one another may wish to converse directly with one another, and doing so using P2P communication might prevent others in the environment from knowing the substance of the conversation. Further, despite being within visual range, the two people may not be close enough to one another to engage in the desired private conversation without using P2P communication. As such, communicating directly using P2P over the respective UEs of the people in the conversation is likely ideal in this scenario. However, in the known art, only if the two people already know one another, and if each device knows the identifier of the other, is the desired P2P communication likely to be available. That is, without any prior knowledge of the other person (i.e., without knowing any identification information, such as a phone number), the problem of establishing a private P2P conversation remains.

An approach to this problem has been to setup a local peer registry in which each person's UE may register its respective identifiers and monitor other neighboring UEs' identifiers. Such a local peer registry may either be realized by: 1) setting up a local broadcast radio channel for peer announcement and discovery; or 2) setting up a central location server to which UEs may report their respective global positioning system (GPS) coordinates and identifiers through a wireless WAN connection (whereby the proximity is determined according to their reported locations). However, particularly in the aforementioned social setting, it may be very difficult for a person (or user) to find a particular identifier of the other user with whom he or she is interested in conversing, such as due to the fact that there maybe many people using the local peer registry.

Accordingly, there is a need for a user to be able to associate a particular identifier of a UE with the user of the UE.

SUMMARY

The present disclosure provides techniques for associating an electronic identifier of a UE with the user of the UE.

Embodiments of the present disclosure are directed to apparatus, systems, methods, and computer programs for associating an electronic identifier of a UE with a user of the UE. In one embodiment, a UE may transmit an electronic identifier associated with the UE for receiving by a second UE. A perceivable cue associated with the electronic identifier may be indicated to a second user. The UE or the user of the UE may indicate the perceivable cue to the second user.

Another embodiment of the present disclosure is directed to apparatus, systems, methods, and computer programs for communicating with a UE of a first user having a unique first electronic identifier. A second UE may receive the unique first electronic identifier associated with the UE. The second UE may receive a perceivable cue associated with the unique electronic identifier. Further, the second UE may communicate with the UE based on a selecting of the perceivable cue.

Yet another embodiment of the present disclosure is directed to apparatus, systems, methods, and computer programs for enabling communication between at least two UEs of a plurality of UEs. A first of the at least two UEs may display perceivable cues indicative of nearby ones of the plurality of UEs. The first UE may receive an input from a user selecting one of the perceivable cues. The first UE may receive an electronic identifier associated with the selected perceivable cue, and may initiate communication with another of the plurality of UEs indicated by the selected perceivable cue and by the electronic identifier.

A further embodiment of the present disclosure is directed to apparatus, systems, methods, and computer programs for connecting peer devices in a geographical area. A network communications hub may assign a perceivable cue, such as from an available set of perceivable cues, to a first of the peer devices. A network communications hub may also uniquely associate an electronic identifier with the perceivable cue of the first of the peer devices. Responsively to a request from a second of the peer devices to communicate with a device identified by the perceivable cue of the first of the peer devices, a network communications hub may provide peer-to-peer communication between the first device as identified by the electronic identifier, and the second of the peer devices as identified by at least a second electronic identifier.

Various aspects and features of the disclosure are described in further detail below.

DETAILED DESCRIPTION

Figure 1:
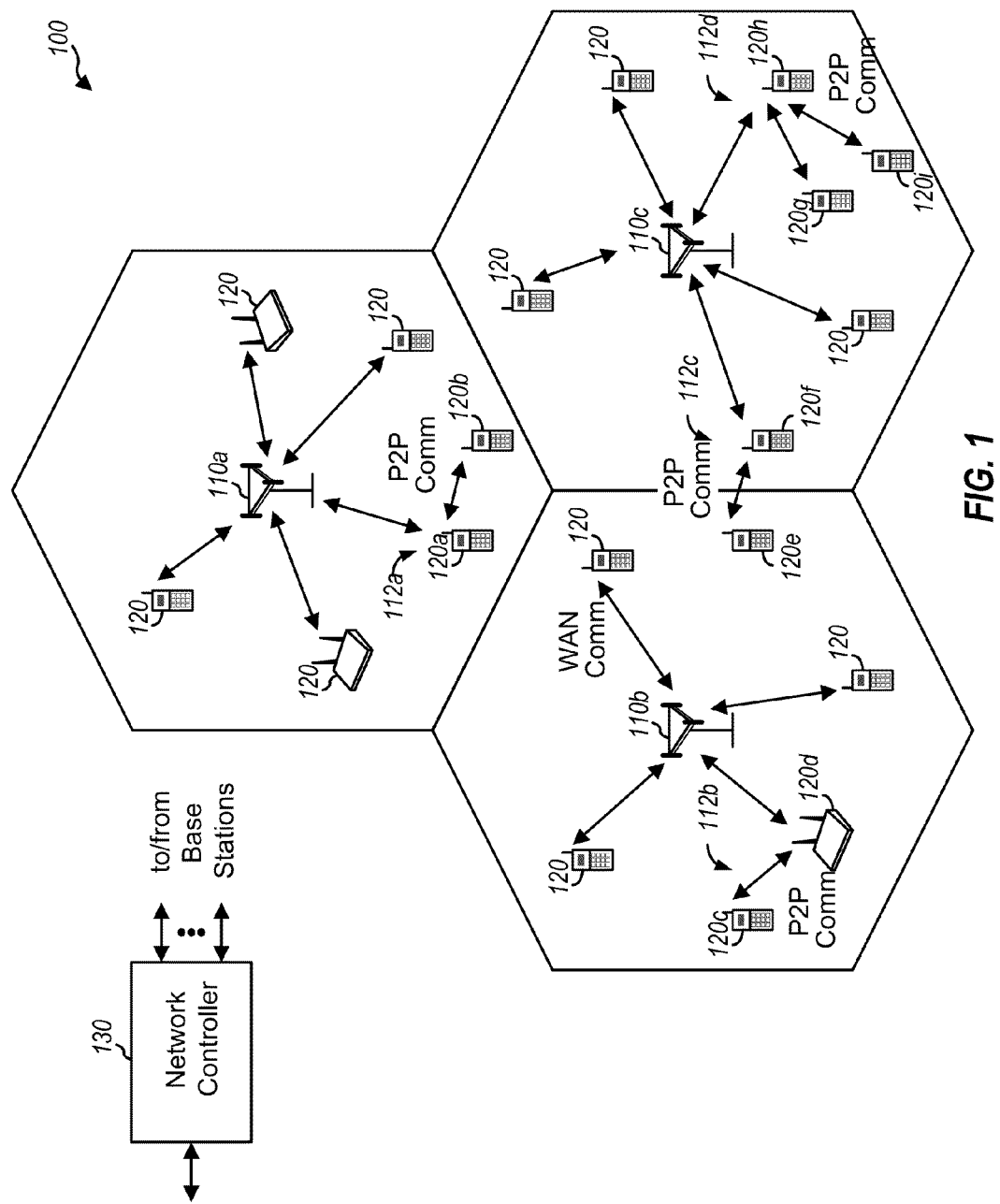
FIG. 1 shows a wireless network supporting P2P communication according to an embodiment of the present disclosure.

The figures and descriptions of the disclosure have been simplified to illustrate elements that are relevant for clear understanding, while eliminating, for the purposes of clarity and brevity, other elements found in typical telecommunications apparatuses, systems, and methods. Those of ordinary skill in the art will thus recognize the other elements and/or steps that are desirable and/or required in implementing the disclosure. However, because such elements and steps are well known in the art, and because they do not facilitate a better understanding of the present invention, a discussion of such elements and steps is not provided herein. The disclosure herein is nevertheless directed to all variations and modifications to the disclosed elements and steps that will be known or apparent to those skilled in the art in light of this disclosure.

The techniques described herein may be used for various wireless communication networks, such as CDMA, TDMA, FDMA, OFDMA, SC-FDMA, and other wireless networks. The terms "network" and "system" are often used interchangeably herein. By way of example, a CDMA network may implement a radio technology such as Universal Terrestrial Radio Access (UTRA), cdma2000, and the like. UTRA includes Wideband CDMA (WCDMA), Time Division Synchronous CDMA (TD-SCDMA), and other variants of CDMA, and cdma2000 covers IS-2000, IS-95, and IS-856 standards. A TDMA network may implement a radio technology, such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, and the like. UTRA and E-UTRA are part of Universal Mobile Telecommunication System (UMTS). 3GPP Long Term Evolution (LTE) and LTE-Advanced (LTE-A), in both Frequency Division Duplex (FDD) and Time Division Duplex (TDD), are new releases of UMTS that use E-UTRA. UTRA, E-UTRA, UMTS, LTE, LTE-A and GSM are described in documents from an organization named "3rd Generation Partnership Project" (3GPP). UMB and cdma2000 are described in documents from an organization named "3rd Generation Partnership Project 2" (3GPP2). The techniques described herein may be used for the wireless networks and radio technologies mentioned above, as well as for other wireless networks and radio technologies.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones or bins, for example. Each subcarrier may be modulated with data. In general, modulation symbols are created in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024, or 2048 for system bandwidth of 1.25, 2.5, 5, 10, or 20 megahertz (MHz), respectively. The system bandwidth may also be partitioned into subbands. Each subband may cover a range of frequencies, such as, for example, a range of frequencies spanning 1.08 MHz.

The available subcarriers and symbol periods for each of the downlink and uplink may be partitioned into RBs. Each RB may cover 12 subcarriers (tones) in one slot and have a duration of L symbol periods (e.g., seven symbol periods), and may include a number of resource elements. Each resource element may consist of one subcarrier in one symbol period and may be used to send one modulation symbol, which may be a real or complex value.

FIG. 1 shows a wireless WAN 100, which may be an LTE network or other WAN. WAN 100 may include a number of network communications hubs and other network entities. For simplicity, only three network communications hubs 110a, 110b, and 110c, and one network controller 130 for providing network communications hub coordination and control, are shown in FIG. 1. A network communications hub may communicate with the UEs, and may also be referred to as a Node B, an evolved Node B (eNB), an access point, or the like. Each network communications hub may provide communication coverage for a particular geographical area and may support communication for the UEs located within the coverage area. In 3GPP, the term "cell" can refer to a coverage area of a network communications hub and/or a network communications hub subsystem serving this coverage area, depending on the context in which the term is used. In 3GPP2, the term "sector" or "cell-sector" can refer to a coverage area of a network communications hub and/or a network communications hub subsystem serving this coverage area. For clarity, the 3GPP concept of "cell" is typically used in the description herein.

A network communications hub may provide communication coverage for a macro cell, a pico cell, a femto cell, and/or other types of cells. A macro cell may cover a relatively large geographical area (e.g., several kilometers in radius) and may allow unrestricted access by UEs with a service subscription. A pico cell may cover a relatively small geographical area and may allow unrestricted access by UEs with a service subscription. A femto cell may cover a relatively small geographical area (e.g., a home, a restaurant, a pub, a library) and may allow for restricted access by UEs having association with the femto cell (e.g., UEs in a Closed Subscriber Group (CSG)). In the example shown in FIG. 1, WAN 100 includes network communications hubs 110a, 110b, and 110c for correspondent cells. These network communications hubs 110a, 110b, and 110c may be pico network communications hubs for pico cells, and/or home network communications hubs for femto cells. Certain aspects of the disclosure may be particularly applicable to smaller geographical environments, in which people are within a visual range of one another (e.g. restaurants, pubs, libraries, and the like, hereinafter also referred to as pico cells, femto cells, or "small" cells). As such, network communications hubs, nodes, or relays that provide or are on the order of a pico cell or femto cell, i.e., that cover a relatively small geographical area, may be particularly suitable for use in the present disclosure.

WAN 100 may also include relays. A relay may be an entity that receives a transmission of data from an upstream entity (e.g., a network communications hub, a UE, or a superordinate relay station) and sends a transmission of the data to a downstream entity (e.g., a UE, a network communications hub, or a subordinate relay station), and as such a relay may provide, or contribute to the providing of, a pico or femto cell. A relay may also be a UE that relays transmissions for other UEs. Although much of the discussion herein may be made without reference to relays, those skilled in the art will nevertheless appreciate that relays may be included in the networks, cells, and systems herein described.

UEs 120 may be dispersed throughout WAN 100, and each UE may be stationary or mobile, although in the most typical embodiments of the instant disclosure the UE will be mobile. A UE may also be referred to as a station, a mobile station, a mobile device, a terminal, an access terminal, a subscriber unit, or the like. A mobile UE, as used herein, may be, by way of non-limiting example, a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, or the like. A UE may be able to communicate with network communications hubs, relays, and other UEs, for example.

In the description herein, WAN communication refers to communication between a UE and a network communications hub, such as for a call between the UE and a remote entity, such as another UE, via the network communications hub. A WAN link and variants thereof, as used herein, thus refers to a communication link between a UE and a network communications hub.

In contrast, a P2P communication, as used herein, refers to direct communication between two or more UEs, wherein the direct communication occurs without going through a network communications hub. A P2P link, or variants thereof, thus refers to a direct communication link between two or more UEs engaged in P2P communication. Correspondingly, a WAN UE is a UE that is interested or engaged in WAN communication, and a P2P UE is a UE that is interested or engaged in P2P communication. A UE, as used herein, may be a WAN UE or a P2P UE.

A P2P group refers to a group of two or more UEs engaged in P2P communication. In one design, one UE in the P2P group may be designated as a P2P server (or a P2P group owner), and each remaining UE in the P2P group may be designated as a P2P client. The P2P server may perform certain management functions, such as exchanging signaling with a WAN, coordinating data transmission between the P2P server and the P2P client(s), and the like.

In general, P2P communication may be supported on the same channels used by WAN 100 in a co-channel P2P deployment (though not necessarily at the same time), or on different channels not used by WAN 100. Co-channel P2P deployment may be used, for example, when a separate channel is not available to support P2P communication.

In the example shown in FIG. 1, a P2P group 112a includes UEs 120a and 120b under the coverage of network communications hub 110a. A P2P group 112b includes UEs 120c and 120d under the coverage of network communications hub 110b. A P2P group 112c includes UEs 120e and 120f under the coverage of different network communications hubs 110b and 110c. A P2P group 112d includes UEs 120g, 120h, and 120i under the coverage of network communications hub 110c. UEs 120a, 120c, 120e, and 120h may be P2P servers for P2P groups 112a, 112b, 112c, and 112d, respectively. UEs 120b, 120d, 120f, 120g, and 120i may be P2P clients in their respective P2P groups. The other UEs 120 in FIG. 1 may be engaged in WAN communication.

In general, communication in the illustrated network may be facilitated via transmissions on the downlink and uplink. For WAN communication, the downlink (or forward link) refers to the communication link from network communications hubs to UEs, and the uplink (or reverse link) refers to the communication link from UEs to network communications hubs. Thus, for P2P communication, P2P downlink refers to the communication link from P2P servers to P2P clients, and P2P uplink refers to the communication link from P2P clients to P2P servers.

P2P communication may offer certain advantages over WAN communication, particularly for UEs located close to each other. In particular, efficiency for P2P communication may improve, at least because the path loss between two UEs may be substantially smaller than the path loss between, for example, a UE and its respective serving network communications hub.

In general, WAN 100 may have downlink resources used for transmission on the downlink and uplink resources used for transmission on the uplink. In general, the downlink resources and uplink resources may comprise different frequency and/or time resources. P2P communication may be typically supported on the uplink resources instead of the downlink resources. This is because P2P transmissions on downlink resources would require UEs to transmit on the downlink, which may not be allowed by regulatory bodies in many countries.

Figure 2B:
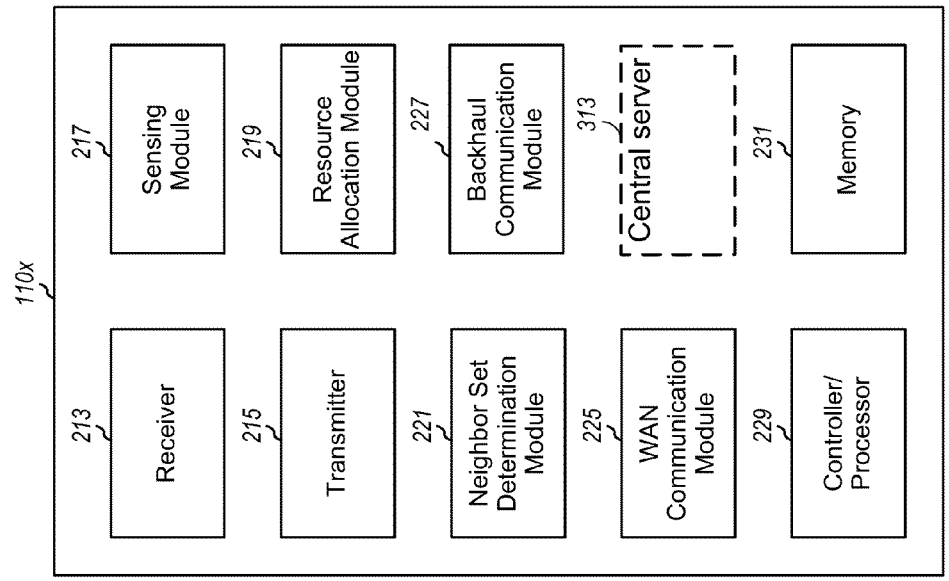
FIG. 2B shows a block diagram of a network communications hub according to an embodiment of the present disclosure.
Figure 2A:
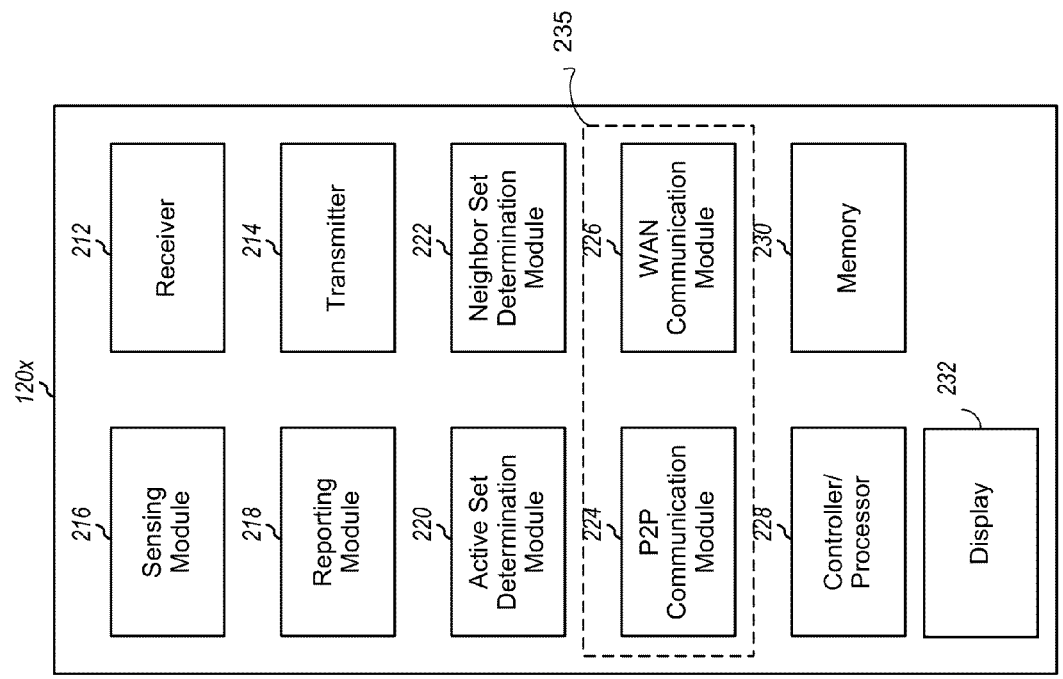
FIG. 2A shows a block diagram of a UE capable of P2P communication according to an embodiment of the present disclosure.

FIG. 2A shows a block diagram of a UE 120x capable of P2P communication and WAN communication. Within UE 120x, a receiver 212 may receive P2P signals transmitted by other UEs for P2P communication, peer discovery signals, and downlink signals transmitted by network communications hubs for WAN communication, by way of non-limiting example. A transmitter 214 may transmit P2P signals to other UEs for P2P communication, peer discovery signals, and uplink signals to network communications hubs for WAN communication, by way of non-limiting example. A sensing module 216 may detect the presence of other UEs, such as using peer discovery signals, and network communications hubs and may measure channel gains, received power, and the like, for example, for the detected UEs and network communications hubs. An active set determination module 220 may perform peer discovery to determine an active set of UE 120x based on the measurements, such as of peer discovery signals, for example, made by sensing module 216. This active set may consist of other UEs within the vicinity of UE 120x. A neighbor set determination module 222 may determine a neighbor set of UE 120x (if applicable) based on the active set of the UE 120x, the active sets of other UEs communicating with UE 120x, and/or UEs known to a communicative (with the UE 120x) network communications hub. A reporting module 218 may send information indicative of the active set, neighbor set, and channel gains, for example, to a corresponded network communications hub and/or to other UEs. A P2P communication module 224 may support P2P communication, e.g., may generate and process signals used for P2P communication. A WAN communication module 226 may support WAN communication, e.g., may generate and process signals used for WAN communication. P2P communication module 224 and WAN communication module 226 may be referred to collectively as communications module 235. The various modules within UE 120x may operate as described hereinthroughout. A controller/processor 228 may direct the operation of various modules within UE 120x. A memory 230 may store data and program codes for UE 120x. A display 232 may display information, for example, portrayals of perceivable cues as well as electronic identifiers on UE 120x.

FIG. 2B shows a block diagram of a network communications hub 110x supporting P2P communication and WAN communication. Within network communications hub 110x, a receiver 213 may receive uplink signals transmitted by UEs to support WAN communication and P2P communication. A transmitter 215 may transmit downlink signals to UEs to support WAN and P2P communications. A sensing module 217 may detect the presence of UEs, may measure channel gains, received power, and the like, for example, of the detected UEs. A resource allocation module 219 may allocate resources needed for P2P communication between UEs. This may include assigning resource blocks for the transmission of data and control information. A neighbor set determination module 221 may determine a neighbor set of network communications hub 110x, such as, for example, based on the active sets of UEs communicating with network communications hub 110x, and based on adjacent network communications hubs. A WAN communication module 225 may support WAN communication for UEs and may, for example, generate and process signals used for WAN communication. A backhaul communication module 227 may support communication with other network entities (for example, network communications hubs) via the backhaul. The various modules within network communications hub 110x may operate as described herein. A controller/processor 229 may direct the operation of various modules within network communications hub 110x. A memory 231 may store data and program codes for network communications hub 110x.

Peer discovery, as used herein, refers to processes performed by a UE to detect other UEs in active and/or neighbor sets. Peer discovery may occur, as used herein, either by communication through or for WAN or P2P. Peer discovery may occur by any means known in the art, including, but not limited to, access to peer listings at a network communications hub, and use of peer discovery resources in P2P, and particularly P2P LTE embodiments. As used herein, peer discovery leads to knowledge, by a UE, of electronic identifiers of other devices or nodes in the active or neighbor set of that UE. An electronic identifier, as used herein, may be a temporary identifier that is associated with a permanent identifier. The permanent identifier may be a unique identifier associated with the UE. For example, the unique identifier may be a PUCCH resource, a phone number, a SIM code, or any like identifier suitable for electronic communication and capable of uniquely identifying a UE. In other embodiments, the temporary identifier may be associated with a characteristic of the UE. Upon performance of peer discovery, communication with a particular user of a UE may still be difficult without knowledge matching the electronic identifier identified in peer discovery with the physical user with whom communication is desired. Accordingly, the techniques described herein may provide for an association of an electronic identifier of a UE with the particular user of the UE.

In one embodiment, active sets and neighbor sets may be defined and used, at least in part, to identify those UEs in the local vicinity available for communication. This peer discovery may occur using a network communications hub and WAN resources local to a small environment or geographical area, wherein such small environment is configured as a femto cell or pico cell, or peer discovery may occur via P2P resources, such as may be allotted by a network communications hub for use by UEs within the geographical area. Active sets may be defined for WAN UEs and P2P UEs on a per UE basis. For example, in one design, an active set for a particular UE may include other UEs having signals that may be received with sufficient signal strength by the UE so as to allow for communication by the UE with those other UEs.

Neighbor sets may be defined on a per server node basis, such as, for example, for each network communications hub and/or for each P2P server. The active sets and/or neighbor sets may also be referred to by other names or terminologies, and may be assessed by other resources, such as a local wireless server, as will be understood to those skilled in the art.

A UE may, for example, perform the peer discovery via P2P in order to detect the presence of other UEs, such as for inclusion in its active set. Peer discovery may also be performed by WAN UEs. Peer discovery may also be performed by UEs not currently interested in P2P communication, e.g., WAN UEs with P2P capability, but currently engaged in WAN communication. Peer discovery might not be supported by legacy UEs, which may be unable to receive P2P signals on uplink resources, but such UEs may nevertheless make use of the techniques of the present disclosure using WAN peer discovery, for example.

During peer discovery, the UE may, for example: (i) transmit a proximity detection signal (PDS) to indicate the presence of the UE; and/or (ii) detect proximity detection signals from other UEs. Upon discovery, a UE may be able to associate, such as by receiving an indicated association from, for example, a network communications hub for the current geographical area, a unique electronic identifier with an individual UE transmitting a particular proximity detection signal, for example. However, even upon knowing the electronic identifier (e.g., phone number) of a specific UE, absent prior knowledge of the user of that specific UE the user of the detecting UE may not have a way to associate the electronic identifier of a specific UE with to the specific user that he wishes to contact.

Figure 3:
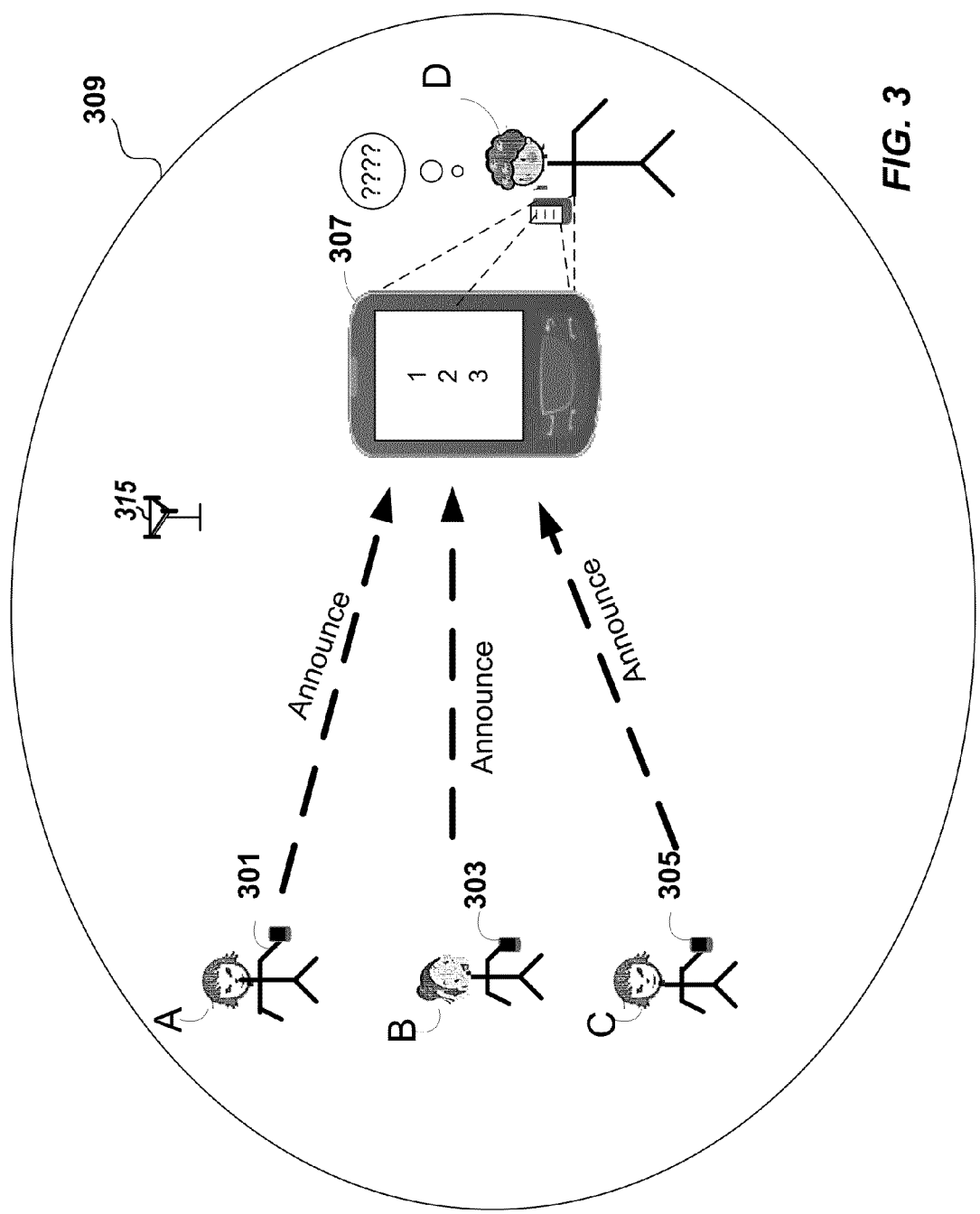
FIG. 3 illustrates a scenario where two users may have difficulty communicating using their respective UEs according to an embodiment of the present disclosure.

FIG. 3 illustrates a scenario where two users may have difficulty communicating with one another, using their respective UEs, at least due to the users' respective lack of knowledge associating the electronic identifier of each UE with the user of each UE. As shown, four users, A, B, C, and D, are within visual range of each other. Their respective UEs, 301, 303, 305, and 307 are situated in a small geographical area 309. One or more network communications hubs 315 may be configured to determine which UEs are in the small geographical area 309, such as using GPS or other location information that UEs may report to a server. One or more network communications hubs 315 may be owned and operated by a single service provider or multiple service providers. This small geographical area 309 may ideally be the geographical area occupied by a limited social setting or group gathering place, such as a restaurant, pub, library, or the like. In the illustrated example, users A, B, C, and D may be patrons at a pub. Patron B sees user D from across the bar, and wishes to have a private conversation with user D. However, due to the presence of other patrons A and C, having a private conversation with user D in this environment may be difficult. However, patrons B and D may be able to talk privately, at least in an electronic sense, by communicating with one another through their respective UEs 303 and 307.

This private UE communication may be made possible by patron D's UE 307 detecting patron B's UE 303 through peer discovery, assuming UE 303's proximity detection signal is of sufficient strength, and/or by assessing that UE 303 is a member of the active or neighbor set of UE 307. Upon peer discovery, UE 307 is able to associate UE 303 with the unique electronic identifier of UE 303. Therefore, patron D could cause UE 307 to select the unique electronic identifier of UE 303, and, in turn, establish communication with user B.

However, electronic identifiers of other patrons UEs 301 and 305, correspondent to other patrons A and C, respectively, are also detected by user D's UE 307. As such, their electronic identifiers are known to, and/or may also be displayed on, UE 307 via the peer discovery. Consequently, patron D may be presented with a list of electronic identifiers (1, 2, 3 in the illustration) on the display of his UE 307. Without previously knowing any contact information (e.g., the electronic identifier) of patron B, patron D has no way of knowing the particular electronic identifier of UE 303 that is uniquely associated with patron B. As such, patron D may have difficulty locating and confirming the appropriate electronic identifier to communicate specifically with patron B. This difficulty is magnified if more patrons (and their respective UEs) are present and detected by UE 307 in the bar. Therefore, a technique is needed for patron D to be able to associate the electronic identifier of UE 303 specifically with patron B.

Thus, in an aspect of the disclosure, a perceivable cue may be associated with an electronic identifier of a UE. Thereby, people in plain sight of one another, and thus likely within the same locale, may associate each other with their respective UEs and the electronic identifiers thereof, making it easier to initiate communication, particularly when each user does not previously have an association of a particular electronic identifier of a UE with its particular user. In one exemplary embodiment, a user's UE may be detected (and recognized by its unique electronic identifier on a peer discovery channel) by another UE only if within a particular coverage area spanning a locale. The user may then display a perceivable cue to the other user (whose UE is in possession of the electronic identifier through the peer discovery) with whom he wishes to communicate. The other user may then locate/confirm a portrayal of that perceivable cue, such as on a graphic display of her UE, and may associate that perceivable cue with the UE's electronic identifier. As such, by selecting the desired perceivable cue, the other user is assured she is contacting the UE of the user with whom she particularly wishes to communicate. For example, once the portrayal of the perceivable cue is selected on the UE, the UE may send the electronic identifier information associated with the perceivable cue to the network communications hub for the geographical area, which, in turn, may establish a radio link for communication between the UEs. Similarly, a P2P connection may be established between the UEs, such as upon selection of the desired perceivable cue portrayal.

Aspects of the disclosure may be particularly useful where private conversation may be difficult between people who wish to meet. By way of non-limiting example, people in a library may want to meet and converse, but the quiet nature of the library may not allow for the levels of volume necessary to meet and talk with someone within a sight line but across the library.

Figure 4:
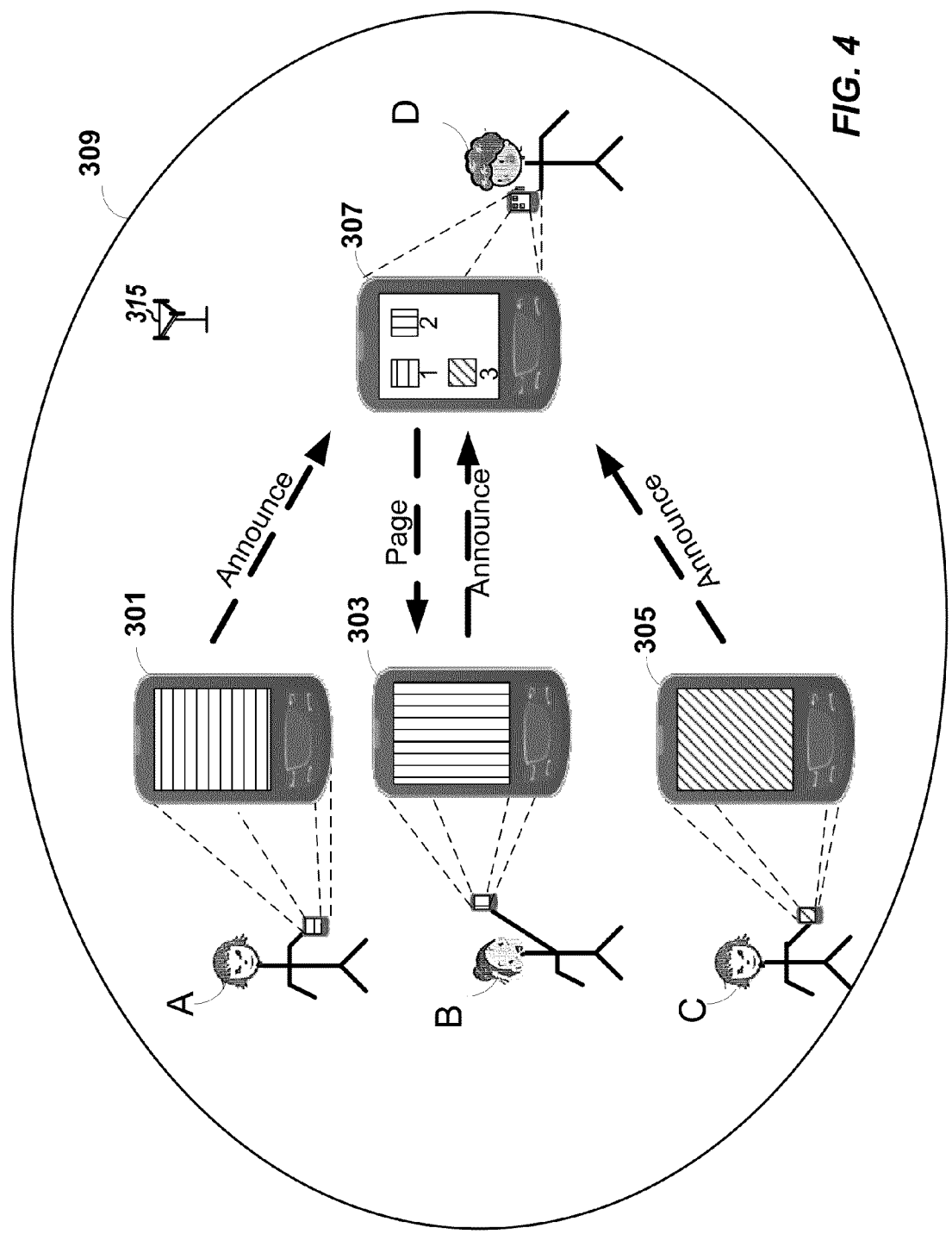
FIG. 4 illustrates use of a perceivable cue by a single UE user according to an embodiment of the present disclosure.

FIG. 4 illustrates an embodiment in which a single user displays a perceivable cue in an attempt to communicate with another user in a small geographical coverage area 309, such as may be provided by network communications hub 315. One or more network communications hubs 315 may be owned and operated by a single service provider or multiple service providers. In an embodiment, network communications hub 315 may assign particular perceivable cues by assigning such cues from a set of available cues for unique association with each of UEs 301, 303, 305, 307. Alternatively, users A, B, C, and D may select their respective cues, such as from a defined set of available cues that may be assigned by network communications hub 315.

Many users may be present within the pub in the illustrated example. However, for purposes of simplicity, four users, A, B, C, and D, and their respective UEs, 301, 303, 305, and 307, are shown. In this example, the assigned/selected perceivable cues are portrayed in the form of image patterns displayed on each of the screens of the UEs 301, 303, and 305 of users A, B, and C, respectively. It should be appreciated that the perceivable cue need not be limited to a visual cue, nor to a visual cue of the type illustrated. For example, the perceivable cue may be auditory, tactile, or any other form recognizable by a human at a distance spanning the vicinity. Further, if the perceivable cue is visual, it may consist of patterns, stripes, pictures, logos, colors, or any combination thereof. If the perceivable cue is audible, it may be a song, a musical note (or notes), a particular tone, a sound of an instrument, a voice, a vocal greeting, or any other cue recognizable by a human ear at a distance spanning the vicinity. A tactile cue may be a vibrating sequence or the like. Moreover, a user physically may move his phone in a certain pattern to provide the perceivable cue, and/or available movement cues may be provided by network communications hub 315, such as wherein network communications hub 315 removes cues from the available cue set as such cues are assigned/selected to/by UEs. The pattern made by the movement of the phone alone may be considered the perceivable cue. For example, with a UE in the user's hand, the user may move the phone in a zig-zag pattern. This "zig-zag pattern" may be portrayed on the display of another UE signifying that the UE associated with the zig-zag pattern has been detected in the vicinity.

The perceivable cue may exist, in part or in whole, disassociated with the screen of a UE. For example, UEs equipped with a light source, such as an LED or the like, may configure the light source to turn on, or blink, in a particular pattern and/or responsive to a certain trigger, such as simultaneously with or related to the transmission of a packet of information. Such an active light source may visually signal to other UEs within view that this UE is currently transmitting, for example.

Aspects of the present invention may also utilize passive visual systems of UEs as perceivable cues to associate an electronic identifier of a UE with its user. Specifically, each UE in a vicinity may broadcast its electronic identifier, along with UEs in its camera view, for peer detection by UEs detected in the vicinity. For example, a UE may overlay a coordinate grid in its camera display window, and assign coordinates to the different UEs located in the camera's display window with respect to itself. Based on the coordinates of other UEs as viewed in the camera display window relative to its own position (such as at coordinates (0,0)), the user may be enabled to associate a physical location of another UE relative to its own location. Thus, the user's relative physical location on a grid in relation to desired UEs for communications may be the perceivable cue that is associated with the electronic identifier of the UE of the user with whom communication is desired.

In the example of FIG. 4, UE 301's screen may display a series of horizontal lines, UE 303's screen may display a series of vertical lines, and UE 305's screen may display a series of diagonal lines. In operation, user B may wish to communicate with user D, who may be in the visual range of user B. By displaying the pattern of vertical lines on her UE 303, user B may gain the attention of user D. Along with displaying this image pattern, UE 303 may have announced an electronic identifier, such as through peer discovery as a member of the active set of UE 307 within the geographical area 309 provided by network communications hub 315. User D may then initiate communication with user B by locating/confirming the image pattern (series of vertical lines) of the user with whom he wishes to communicate, such as by actuating an actuator on UE 307 indicative of the image pattern of UE 303 to thereby request communications with the electronic identifier corresponded to that image pattern as shown on the display screen of his UE 307. For example, upon actuation/selection of the desired pattern by user D on UE 307, a page may be initiated from UE 307 addressed to the electronic identifier of UE 303 in an attempt to establish communication between user D and user B.

Figure 5:
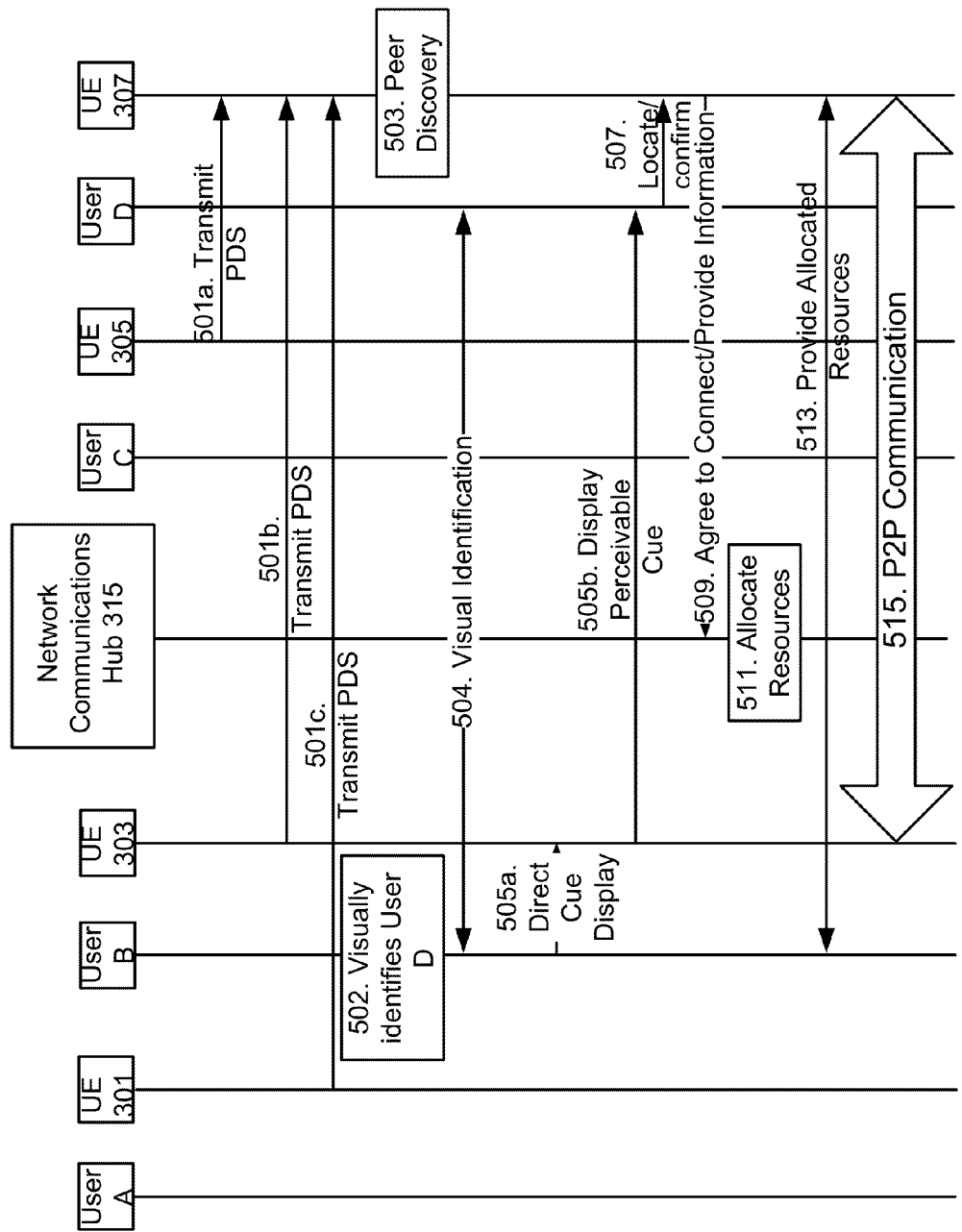
FIG. 5 shows a process for associating an electronic identification of a UE with its user, using peer-to-peer communication, according to an embodiment of the present disclosure.

FIG. 5 shows a network diagram of network/device processing 500 for associating an electronic identification of a UE with its user. In the illustrated embodiment, this association occurs using peer-to-peer communication. For simplicity, FIG. 5 shows four users A, B, C, and D and their respective UEs 301, 303, 305, and 307 and network communications hub 315 in geographical area 309. One or more network communications hubs 315 may be owned and operated by a single service provider or multiple service providers. In this example, user D's UE 307 is performing peer discovery, however, some or all UEs, such as P2P capable UEs, in the locale may perform peer discovery. In general, associating an electronic identifier of a UE with its user may be performed for any number of users and their UEs.

UEs 301, 303, and 305 may transmit peer discovery signals, such as proximity detection signals (steps 501a, 501b, and 501c), which may be detected by other UEs (UE 307 in this example). UE 307 may then perform peer discovery at step 503 based on these proximity detection signals, although those skilled in the art will appreciate that other means of peer discovery may be performed. In this peer discovery (step 503), UE 307 may detect the proximity detection signals, and subsequently may associate a unique electronic identifier with each proximity detection signal. This electronic identifier may be provided, such as via a peer discovery channel, to UE 307.

In the illustrated example, user B may visually identify, and wish to talk to, user D at step 502. User B may accordingly direct her UE 303 to display her perceivable cue to user D at step 505a, and her perceivable cue may be thus displayed at step 505b. Further, a portrayal of her perceivable cue may be displayed on user D's UE 307. Because there is an association between the electronic identifier of UE 303 and user B's perceivable cue, UE 307 may be able to figure out the perceivable cue to display (for user B) based on a PDS signal from UE 303 detected in the peer discovery channel. On the other hand, UE 303 may send a message (for example, by broadcast to other UEs) to UE 307 that indicates the perceivable cue associated with UE 303. The message may indicate by sending a picture, pattern (i.e., portrayal of the pattern), by sending a table entry or the like, from which the receiving UE may recreate the portrayal of the perceivable cure on its screen. In some cases, such a message may be sent by network communications hub 315 rather than by the UE 303. Noting the perceivable cue of user B, user D may check the graphic display of his UE 307 to locate/confirm (step 507) the association of UE 303's electronic identifier with her portrayed perceivable cue. User D may then actuate, such as by pushing on a screen of UE 307 atop the desired portrayed perceivable cue, by moving a cursor to highlight and actuate the desired portrayed perceivable cue, or by otherwise indicating the desired portrayed perceivable cue on UE 307, a request to communicate, from his UE 307 to the electronic identifier of UE 303, to the network communications hub 315 at step 509, or directly to UE 303 without intervention by the network communications hub 315. Based on this electronic identification information, at step 511, the network communications hub 315 may, allocate resources to user B's UE 303 and user D's UE 307 for P2P communication, for example. The network communications hub 315 may provide the allocated resources to user D and user B at step 513. User D and user B may thereafter communicate via P2P using the allocated resources (step 515).

In some cases, there may be more detected UEs (and corresponding electronic identifiers) in the same vicinity than there are distinct perceivable cues in a set of selected perceivable cues, i.e., the network communications hub 315 may select a set of cues based on a number of UEs in a geographical area neighbor set, and as the number of UEs grows, the number may exceed the number of available unique perceivable cues that may be assigned. In this instance, a single perceivable cue may be associated with more than one electronic identifier. As a result, there is a chance that a user establishes a communication session with someone other than the intended user. In other words, there is a possibility in this circumstance that the wrong user is contacted.

Figure 6:
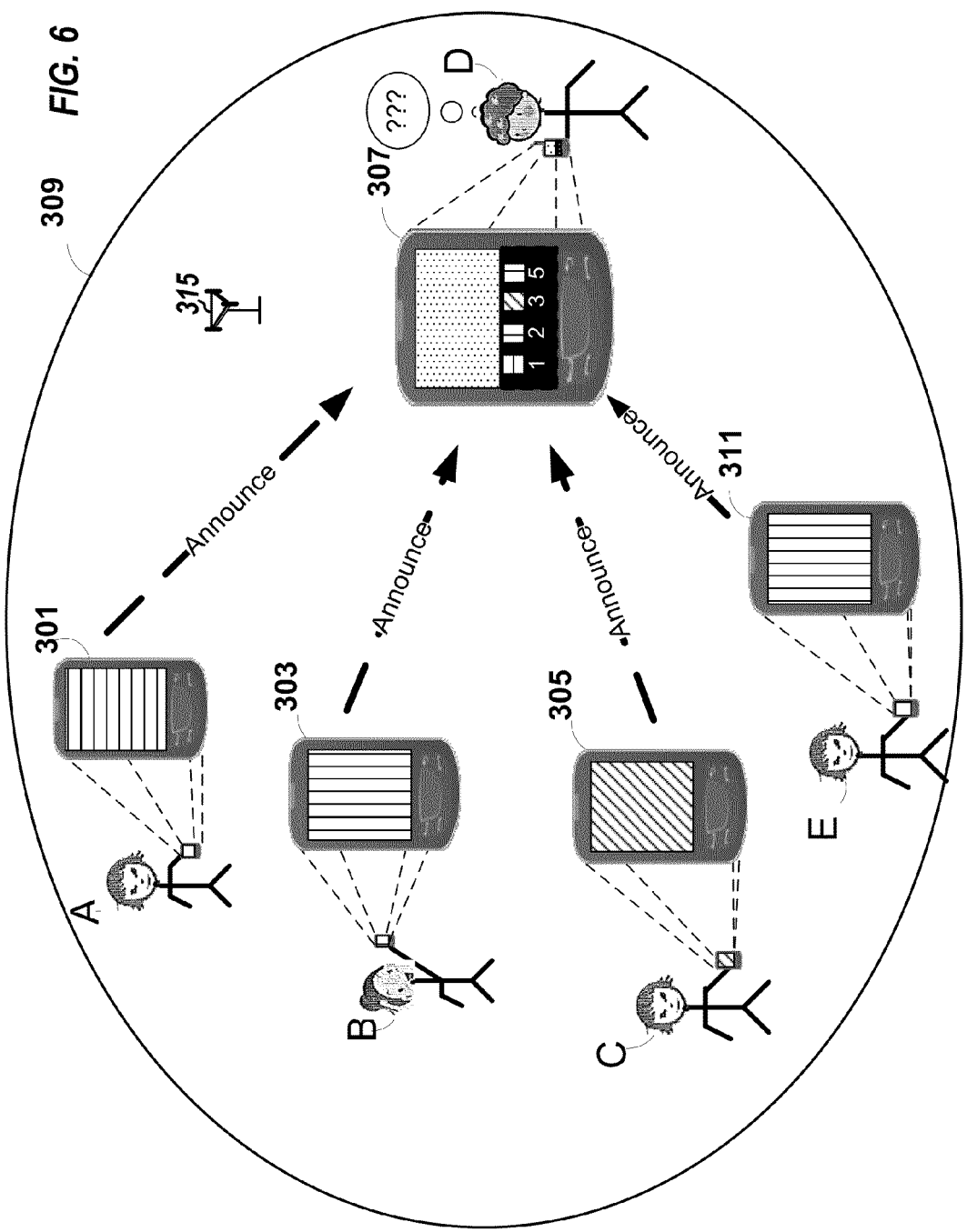
FIG. 6 illustrates a scenario in which a perceivable cue may be associated with more than one UE according to an embodiment of the present disclosure.

An example of this scenario is shown in FIG. 6, in which there are more UEs than there are distinct perceivable cues in the geographical area 309. FIG. 6 shows five users A, B, C, D, and E, their respective UEs 301, 303, 305, 307, and 311, and network communications hub 315. In this example, there are five users and only four distinct perceivable cues. Specifically, two users, B and E, have the same perceivable cue (a series of vertical lines). UEs 301, 303, 305, 307, and 311 may announce their respective identifiers (such as by transmitting their proximity detection signals), and, as in the previous examples, UE 307 may perform peer discovery. Further, as with FIG. 4, user B may wish to talk to user D, and user B may thus display her perceivable cue to user D. A portrayal of her perceivable cue is then displayed on user D's UE 307. However, because users B and E both have a perceivable cue of a series of vertical lines, user D now sees two portrayals of the same perceivable cue on the screen of his UE 307. Consequently, there is a chance that user D may initiate communications from his UE 307 to the electronic identifier of UE 311, instead of to the electronic identifier of intended user B's UE 303. Thereby, user D runs the risk of contacting an unintended user (User E) rather than user B.

Several techniques may be used to ensure that user B establishes communication with the intended user. One such technique utilizes an exchange of perceivable cues between both users wishing to communicate with one another. Specifically, once user B displays her perceivable cue and user D locates/confirms the perceivable cue (and the associated electronic identifier), user D then displays his perceivable cue back to user B. User B then selects/confirms communication to user D's perceivable cue on her UE 303. Therefore, any uncertainty may be resolved by this bilateral confirmation. However, it is of note that this technique may be used at any time, and not just limited to situations in which multiple users are assigned to the same perceivable cue.

Figure 7:
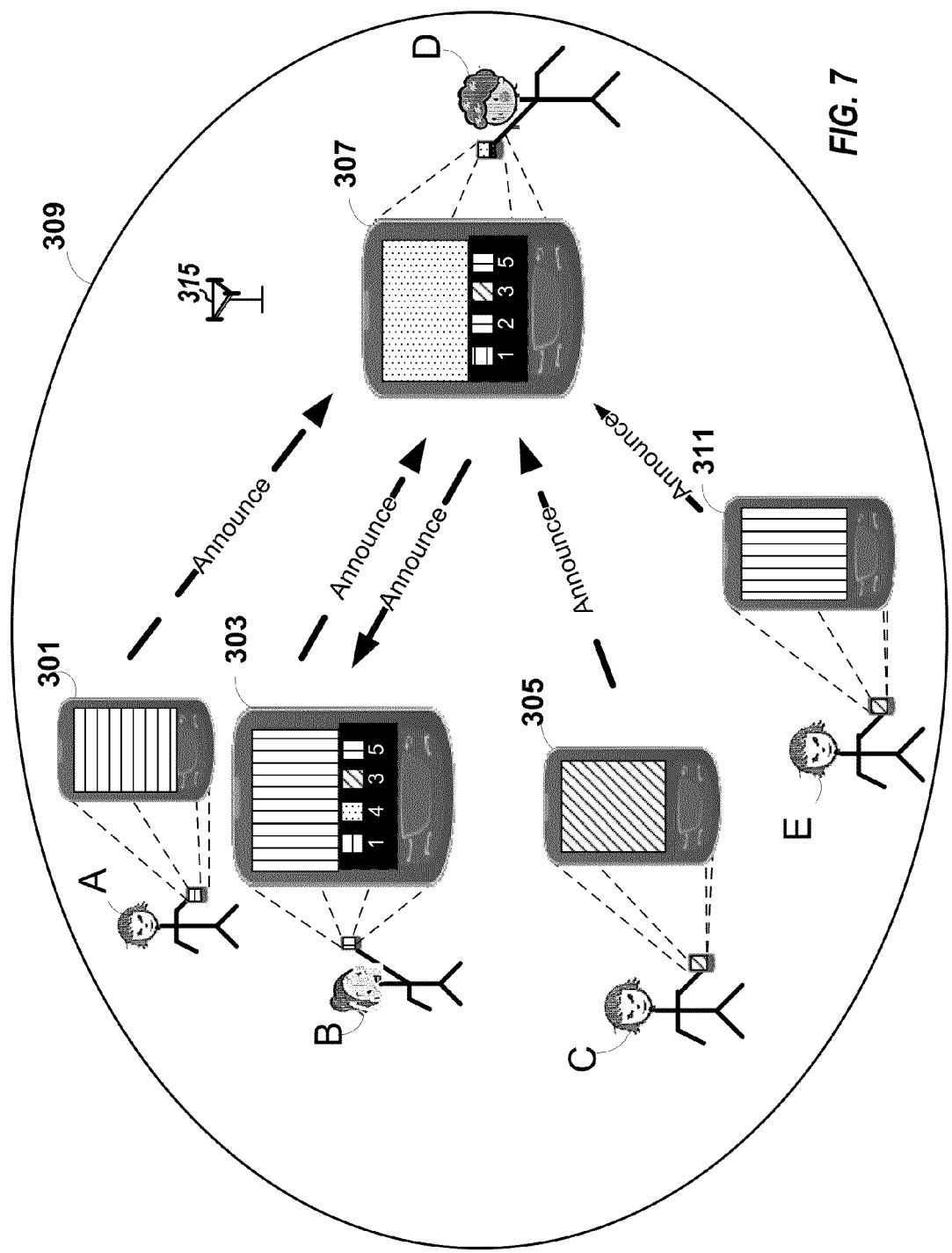
FIG. 7 illustrates an example of utilizing perceivable cues when both users wish to communicate with one another, according to an embodiment of the present disclosure.

FIG. 7 illustrates an example of bilateral technique, wherein both users wishing to communicate with one another may display their respective perceivable cues to trigger announcement of their respective identifiers, and association of each of these identifiers with the desired perceivable cue, to enable the desired communication. FIG. 7 shows five users A, B, C, D, and E, and their respective UEs 301, 303, 305, 307, and 311 within geographical area 309. Because each user confirms the other's perceivable cue in the illustrated embodiment, chances are reduced of establishing a connection with the wrong user. In FIG. 7, user D's UE 307 now displays its perceivable cue (shown as speckled dots) as corresponded to its electronic identifier. In operation, user B, who wishes to communicate with user D, may display her perceivable cue (series of vertical lines) to user D. Along with displaying this perceivable cue, user B's UE 303 may announce its electronic identifier via peer discovery. After locating/confirming that there are more than one of the same perceivable cue (user B and E's image pattern both consist of a series of vertical lines), user D may display his perceivable cue (speckled dots, for example) to user B. User B, as the person who originally displayed her perceivable cue to user D, may then locate/confirm user D's perceivable cue. By confirming user D's perceivable cue, the possibility of user D initiating and establishing communication with the wrong user, user E, is eliminated.

In an alternative embodiment, after both users, B and D, confirm the other's perceivable cue, a third electronic identifier may be established to combine user B and D's identifiers. This third electronic identifier may then be used, by way of non-limiting example, to establish a direct radio link, which may be used for a limited duration after the displaying of perceivable cues. This third electronic identifier may be an electronic identifier pair, and, in this case, only one user, B or D, may need to select the other from this electronic identifier pair as its paging identifier. Initiating of communications, and/or maintenance of communications, between the UEs may thus be greatly simplified through the use of this third electronic identifier. In another alternative, after observing and selecting each others' perceivable cue, each user may change its announced electronic identifier to a new electronic identifier correlated to both users' perceivable cues.

Figure 8:
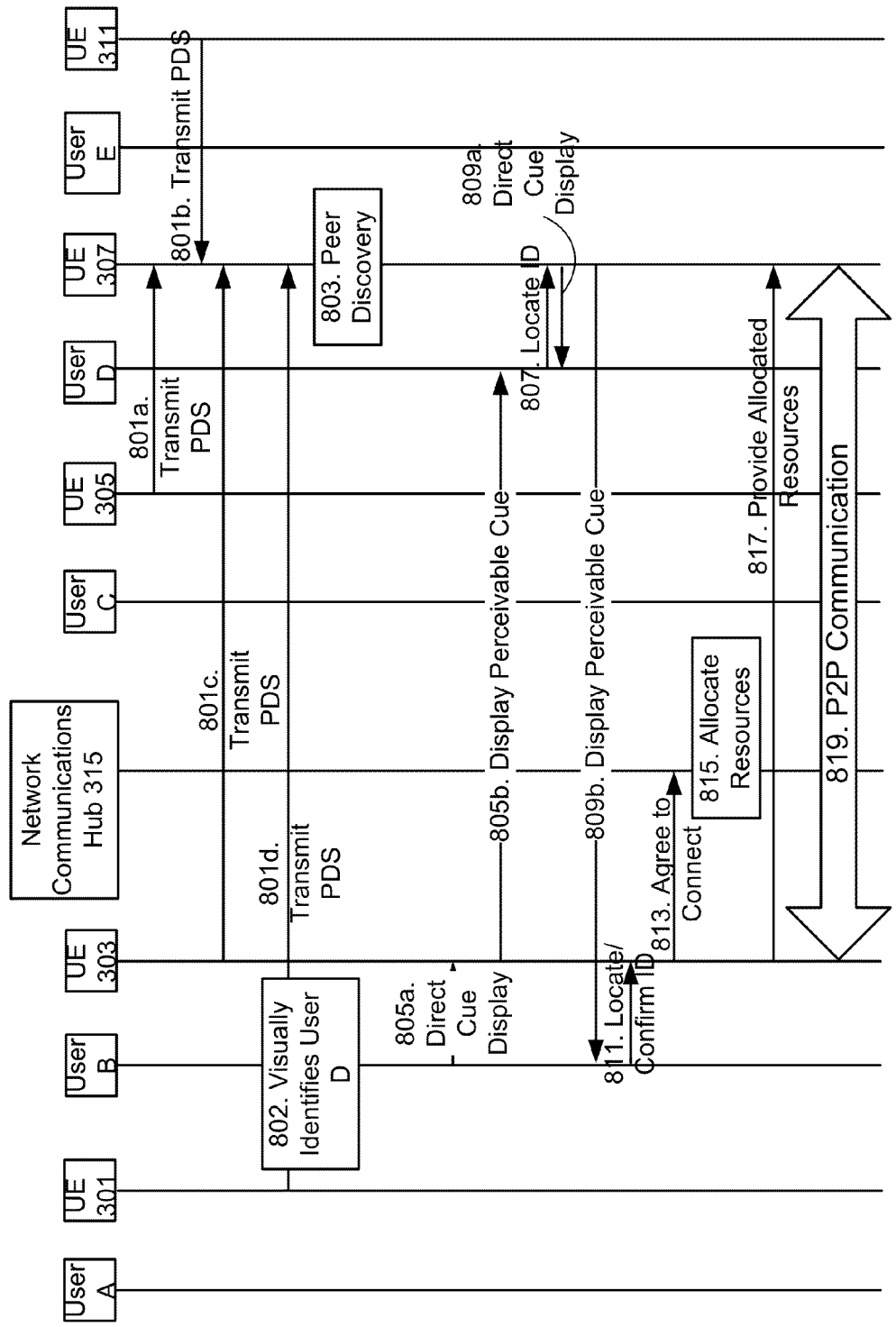
FIG. 8 shows a process for associating an electronic identification of a UE with its user utilizing perceivable cues, according to an embodiment of the present disclosure.

FIG. 8 shows a network diagram of network/device processing 800 for associating an electronic identification of a UE with its user, using peer-to-peer communication, and wherein the association is based on perceivable cues of multiple users wishing to communicate with one another. For simplicity, FIG. 8 shows five users A, B, C, D, and E, their respective UEs 301, 303, 305, 307, and 311, and network communications hub 315. In this example, user D's UE 307 is performing peer discovery; however, some or all UEs, such as P2P capable UEs, in the locale may perform peer discovery. In general, associating an electronic identifier of a UE with its user may be performed for any number of users and their UEs.

UEs 301, 303, 305, and 311 may transmit PDS signals (steps 801*a*, 801*b*, 801*c*, and 801*d*). UE 307 may then perform peer discovery at step 803. In peer discovery, UE 307 may detect, or receive an indication of detection of (such as from network communications hub 315), these signals, and subsequently may associate a unique electronic identifier with each peer discovery signal. The associated electronic identifiers may be learned by, and may be displayed on, user D's UE 307.

User B may wish to talk to user D based on a visual identification at step 802. User B may thus display her perceivable cue to user D, via her UE 303, at steps 805*a* and 805*b*. A portrayal of her perceivable cue is accordingly displayed on user D's UE 307. Noting her perceivable cue, at step 807 user D may check the graphic display of his UE 307 to locate the electronic identifier associated with her portrayed perceivable cue. User D may notice that there is another perceivable cue portrayed on User D's graphic display which is identical to User B's portrayed perceivable cue. At steps 809*a* and 809*b*, user D may responsively present his perceivable cue to user B via his direction to his UE 307. Upon noting user D's perceivable cue, at step 811, user B may then locate/confirm/actuate the electronic identifier associated with user D's perceivable cue. Upon this confirmation, user B may, at step 813, agree to communicate with UE 307, such as by actuating, by selecting a portrayal of the perceivable cue of UE 307 on UE 303 to request that network communications hub 315 provide for communication to the electronic identifier of UE 307. Based on an agreement to communicate from at least user B, at step 815 the network communications hub 315 may allocate resources to user B's UE 303 and user D's UE 307 for P2P communication. The network communications hub 315 may provide the allocated resources to user D's UE 307 (step 817). Alternatively, UE 303 and UE 307 may establish communication without involving network communications hub 315. User D and user B may thereafter communicate using P2P based on the allocated resources (step 819). Further, even if user D and user B are no longer in proximity of one another, they may communicate through their respective UEs through a WAN session according to embodiments of the present invention.

The likelihood that more than one UE is detected with the same perceivable cue increases as the number of detected UEs within a vicinity increases. Therefore, aspects of the disclosure may include a module (e.g., an active set determination module 220 of UE 120*x*, or sensing module 217 of network communications hub 110*x*) to track the number of detailed UEs in the peer discovery channel, and, if necessary, subsequently, assign newly created perceivable cues to the added UEs. Alternatively, module 220/217 may modify the selected set or type of available perceivable UEs for assignment, such as by switching from patterns to pattern/color combinations, to provide any needed level of scalability.

By way of example of operation of module 220/217, additional UEs may continuously be detected on the peer discovery channel (and thus be included in the active set of a UE performing peer discovery, and/or in the neighbor set of network communications hub 315 managing geographical area 309), based on periodic check by module 220/217 of a peer discovery channel and/or resource. Based on the particular number of additional UEs, module 220/217 may change, or add, to the scheme of perceivable cues. For example, if the current scheme of assigned perceivable cues is colors, the module may add more colors, or switch the perceivable cue assignment to patterns of different colors, alphanumeric characters, images, or the like. The images may be any distinguishable images, for example, actual photographs of the user who wishes to communicate. If the perceivable cue filtering still results in more than one peer with the same image pattern, one peer may page each one of the remaining peers to establish a communication session first, and then use other methods to further reveal the peer user's identity to eventually contact the originally intended peer.

Figure 9:
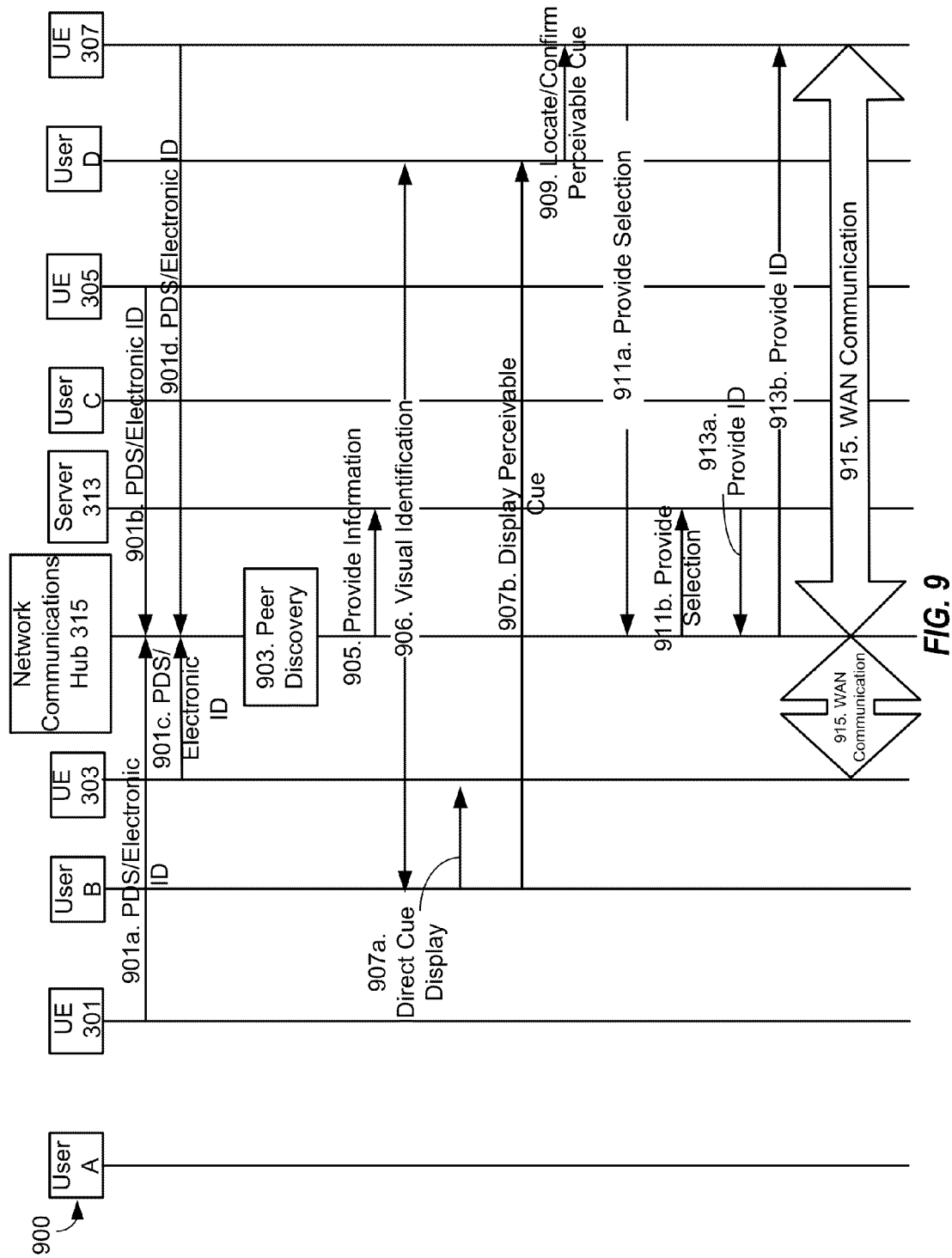
FIG. 9 shows a process for associating an electronic identifier of a UE with a user utilizing a perceivable cue, according to an embodiment of the present disclosure.

One of ordinary skill in the art would recognize that the techniques described herein may apply to P2P as well as WAN communication. FIG. 9 illustrates network/device processing 900 for associating a unique electronic identifier of a UE with a user of the UE via a WAN connection through a central hub or server, illustratively shown as central server 313 in conjunction with network communications hub 315 in FIG. 9. Those skilled in the art will appreciate that central server 313 may be a part of, or directly communicatively associated with, network communications hub 315, or may be distinct from network communications hub 315. As referenced herein, one or more network communication hubs 315 may be owned and operated by a single service provider or multiple service providers.

For simplicity, FIG. 9 shows four users A, B, C, and D, their respective UEs 301, 303, 305, and 307, and a central server 313 which may be located at or in communicative connection with network communications hub 315. UEs 301, 303, 305, and 311 may transmit peer discovery signals (steps 901a, 901b, 901c, and 901d). Network communications hub 315 may then perform peer discovery at step 903. In peer discovery (step 903), the network communications hub 315 may detect the peer discovery signals, and subsequently extract a unique electronic identifier from each of the peer discovery signals, respectively. At step 905, the network communications hub 315 sends this electronic identifier, along with each UE's assigned perceivable cue, or a request to assign to each electronic identifier a perceivable cue or a capability to select a perceivable cue, to central server 313. If User B wishes to talk to user D, for example, user B may direct UE 303 at step 907a to display her perceivable cue to user D at step 907b. Noting this perceivable cue, at step 909 user D may confirm the perceivable cue by selecting/actuating a portrayal of user B's perceivable cue on the screen of his UE 307. At steps 911a and 911b, UE 307 may transmit this perceivable cue selection to the central server 313, such as via the network communications hub 315. The central server 313 may then filter through the identifiers according to the selected perceivable cue, and (at steps 913a and 913b) may provide UE 307 access to, either affirmatively or anonymously, the electronic identifier of UE 303. User D may thus contact and communicate with user B at 915 such as through network communications hub 315. Further, even if user D and user B are no longer in proximity of one another, they may still communicate through their respective UEs through a WAN session according to embodiments of the present invention.

More particularly with respect to anonymity of electronic identifiers, in some cases, a user who wishes to contact another user may wish to prevent the other user from knowing her UE electronic identifier (e.g., phone number, email address, instant messaging name, etc.) or other identifying information, i.e., the user may wish to communicate "anonymously" per the prior example. For example, user B may not wish user D to know any contact information (e.g., electronic identifier) associated with user B's UE, or with user B. In this case, user D may be prevented from attaining the electronic identifier information of user B, but may nevertheless be enabled to communicate with user B. For example, user D may be limited to viewing/selecting the UE of user B based solely on the portrayed perceivable cue (e.g., image pattern) associated with the electronic identifier of user B, without an indication, in whole or at least in part, of the associated electronic identifier and/or of any identifying information. That is, instead of user D being shown the perceivable cue portrayals and the associated electronic identifiers on his screen, the central server 313 and/or UE 307 may hide the electronic identifiers, and may present only the perceivable cue portrayals. However, based on user D's selection, the central server 313 may then be instructed to send user B's identifier to network communications hub 315 (without providing this information to user D in one example) to allow for the establishing of WAN or P2P communication between user B and user D in the exemplary embodiments discussed herein.

Figure 10:
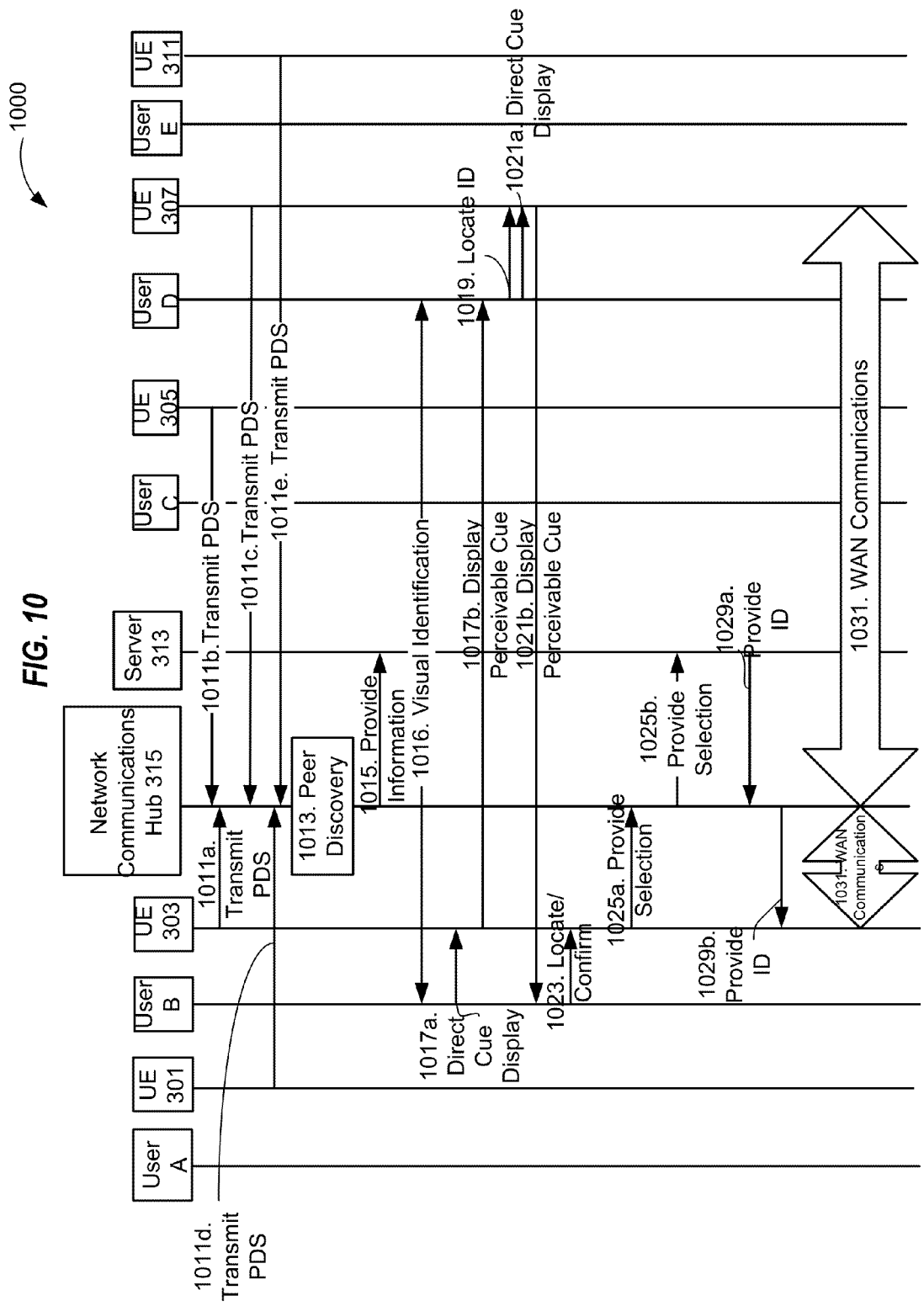
FIG. 10 shows a process for associating an electronic identification of a UE with its user utilizing perceivable cues of two users wishing to communicate with one another, according to an embodiment of the present disclosure.

FIG. 10 shows network/device processing 1000 for associating an electronic identification of a UE with its user, using WAN communication, utilizing perceivable cues of users wishing to communicate with one another.

For simplicity, FIG. 10 shows five users A, B, C, D, and E, their respective UEs 301, 303, 305, 307, and 311, a central location server 313, and a network communications hub 315. One or more network communication hubs 315 may be owned and operated by a single service provider or multiple service providers. UEs 301, 303, 305, 307, and 311 may transmit peer detection signals (steps 1011a, 1011b, 1011c, 1011d, and 1011e). The network communications hub 315 may perform peer discovery at step 1013. In peer discovery (1013), the network communications hub 315 may detect the peer discovery signals, and subsequently associate a unique electronic identifier with each proximity detection signal. At step 1015, the network communications hub sends this electronic identifier information, along with each UE's assigned perceivable cue, to the central server 313. If User B wishes to talk to user D based on a visual identification at step 1016, for example, user B may display her perceivable cue to user D at steps 1017a and 1017b. At step 1019, in the process of locating user B's perceivable cue, user D may notice that there is more than one perceivable cue with user B's image pattern. For user D to be assured that he communicates with the intended user B, user D may display his own perceivable cue to user B at steps 1021a and 1021b. At step 1023, User B may locate and confirm user D's perceivable cue, and subsequently may provide this selection (steps 1025a and 1025b), such as via an actuation of UE 303, to the central server 313 via the network communications hub 315. The central server 313 may then filter through the identifiers according to the selected perceivable cue, and (at steps 1029a and 1029b) provide UE 303 with the electronic identifier of UE 307, actively or anonymously. UE 303 may use this electronic identifier to contact, and communicate (at step 1031) with, UE 307, such as through network communications hub 315 or via P2P communication.

Those skilled in the art will appreciate, in light of the disclosure herein, that although the embodiments of FIGS. 3-10 are discussed, by way of example, with respect to network communications hub 315, other network elements may arbitrate the initiation of a geographical area 309, may monitor for a number of UEs in the geographical area 309, may select cue sets/types for use in the geographical area 309, may make cue assignments in the geographical area 309, and/or may monitor for or execute on communication requests, such as P2P requests, in the geographical area 309. For example, certain of the foregoing examples may make use of a UE acting as a P2P server, a non-network communications hub relay, a local wireless hub or server, or the like, for providing one, ones, or all of the aforementioned functions described herein in relation to network communications hub 315, without departing from the scope of the disclosure herein.

Figure 11A:
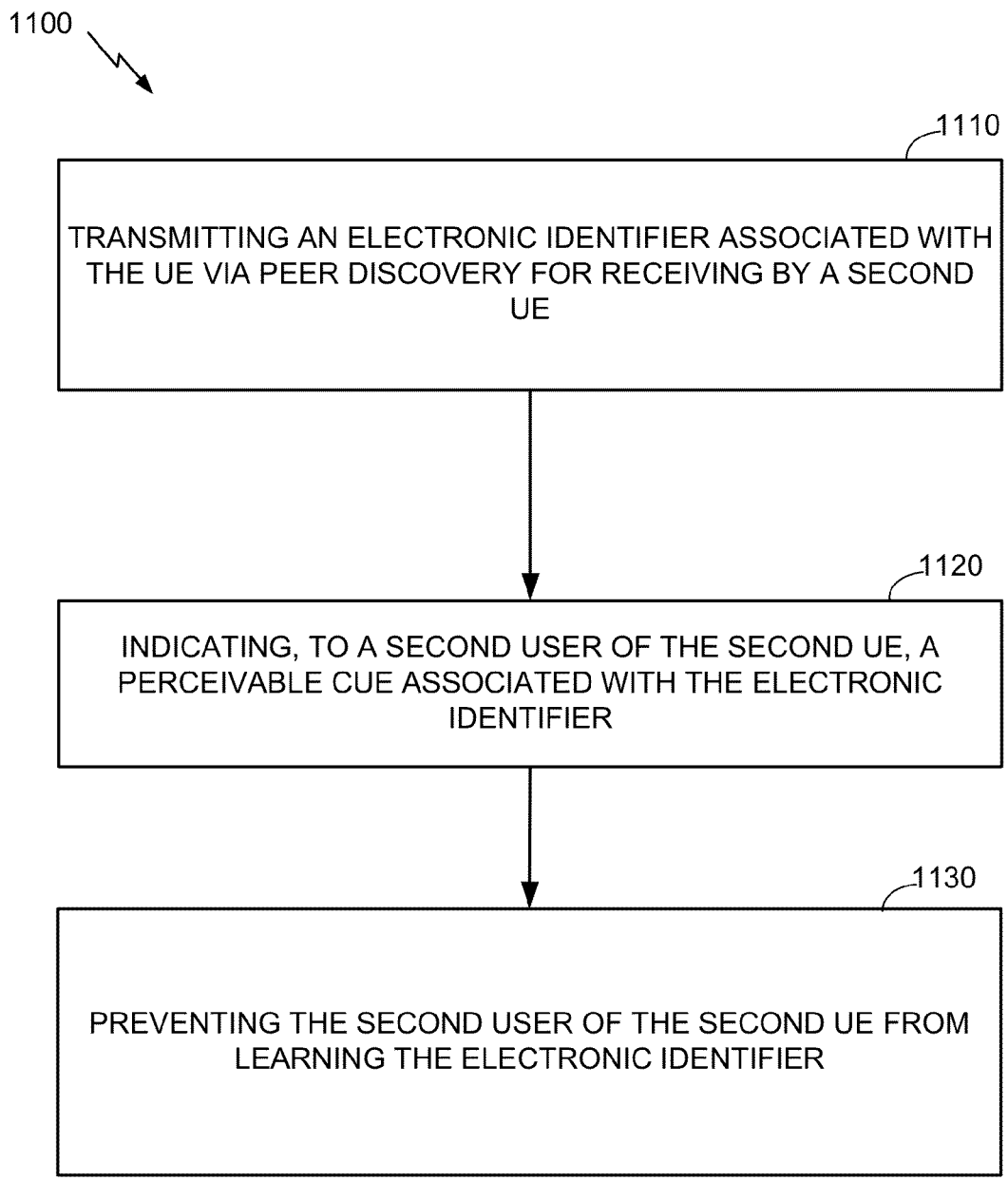
FIGS. 11A and 11B show processes for associating electronic identifiers of UEs with users of UEs according to an embodiment of the present disclosure.

In accordance with one or more embodiments described herein, and with reference to FIG. 11A, there is shown a methodology 1100 operable by a network entity (e.g., a UE such as UE 303). It is noted that numbers associated with the blocks of FIGS. 11A and 11B do not imply a particular order in which the corresponding steps are to be performed according to the method 1100. Specifically, method 1100 describes association of an electronic identifier of a UE with a user of the UE. The method 1100 may involve, at step 1110, a UE (e.g., UE 303) transmitting an electronic identifier associated with the UE, such as on a peer discovery channel, to a second UE (e.g., UE 307). The method 1100 may involve, at step 1120, indicating, to a second user (e.g., user D) of the second UE (e.g., UE 307), a perceivable cue associated with the electronic identifier. The perceivable cue may be perceivably indicated to the second user (e.g., user D) of the second UE (e.g., UE 307) by the UE (e.g., UE 303) or by the user (e.g., user B) of the UE. Step 1130 may involve the UE (e.g., UE 303) preventing a user (e.g., user D) of the second mobile device (e.g., UE 307) from learning the electronic identifier, i.e., step 1130 may include techniques to preserve the anonymity of identifying information associated with the user and/or the UE of the user.

Figure 11B:
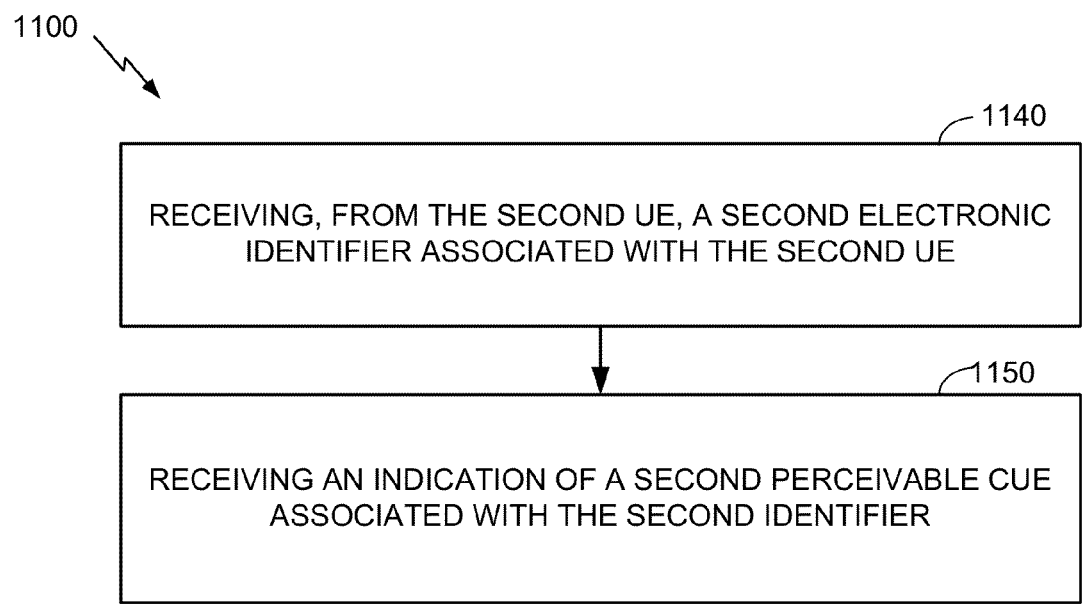

With reference to FIG. 11B, there are shown further operations or aspects that may be optionally included in the method 1100, and that may be performed by a network entity (e.g., a UE such as UE 303). That is, if the method 1100 includes at least one of the afore-discussed steps shown of FIG. 11A, then the method 1100 may terminate after that step without inclusion of any subsequent downstream block(s) that may be additionally illustrated. For example, the method 1100 may further involve: a UE (e.g., UE 303) receiving, from the second UE (e.g., UE 307), a second electronic identifier associated with the second UE (e.g., UE 307) (step 1140), and the UE (e.g., UE 303) receiving an indication of a second perceivable cue associated with the second identifier (step 1150). The second perceivable cue may be indicated by either the second UE (e.g., UE 307) or the second user (e.g. user D). Based on an agreement to communicate with the second perceivable cue, the UE (e.g., UE 303) may accordingly receive a communication from the second UE (e.g., UE 307). This received communication may use a third identifier (step not shown), which may be based on the first and second identifiers. Alternatively, after the UE (e.g., UE 303) receiving an indication of a second perceivable cue associated with the second identifier, the UEs (e.g., UE 303 and UE 307) may switch to the third identifier, without necessarily receiving a communication from the second UE (e.g. UE 307).

Figure 12A:
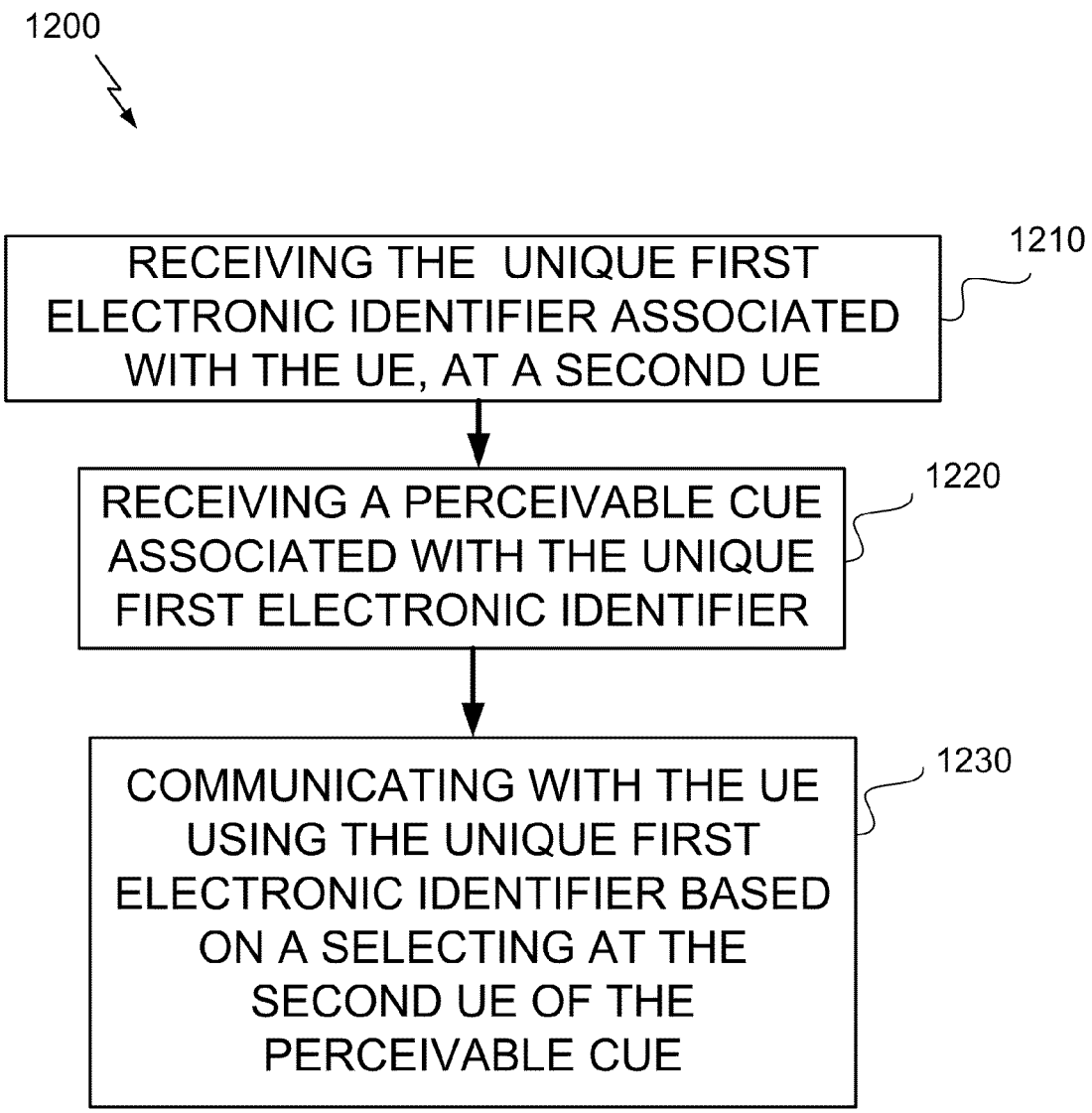
FIGS. 12A and 12B show processes for associating electronic identifiers of UEs with users of UEs according to an embodiment of the present disclosure.

In another embodiment of the present disclosure, with reference to FIG. 12A, there is shown a methodology 1200 for communicating with a second UE (e.g., UE 307) of a first user (e.g. user B) having a unique first electronic identifier, which methodology is operable by a network entity (e.g., a UE or network communications hub). It is noted that numbers associated with the blocks of FIGS. 12A and 12B do not imply a particular order in which the corresponding steps are to be performed according to the method 1200. The method may involve, at step 1210, a second UE (e.g., UE 307) receiving the unique first electronic identifier associated with the UE at the second UE (e.g., UE 307). The method may involve, at step 1220, the second UE (e.g., UE 307) receiving a perceivable cue associated with the unique first electronic identifier, and at step 1230, the second UE (e.g., UE 307) communicating with the UE (e.g., UE 303) using the unique first electronic identifier based on a selecting at the second UE (e.g., UE 307) of the perceivable cue.

Figure 12B:
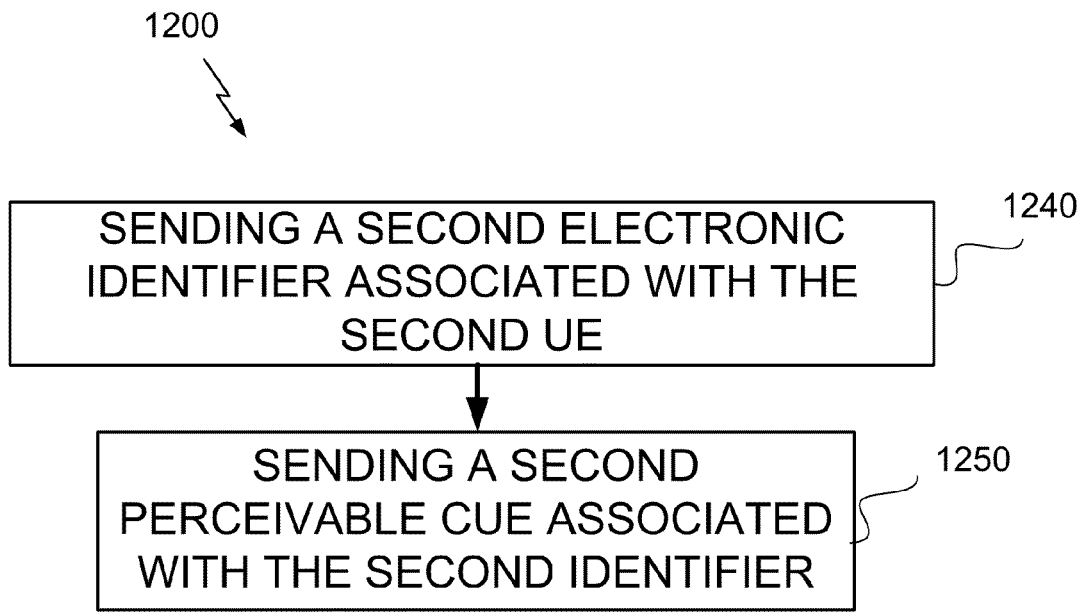

With reference to FIG. 12B, there are shown further operations or aspects that may be optionally performed in the method 1200 by a network entity, such as by a second UE (e.g., UE 307) or the like. If the method 1200 includes at least one step of FIG. 12A, then the method 1200 may terminate after the at least one step, without necessarily including any subsequent downstream block(s) that may be illustrated. For example, the method 1200 may further involve, at step 1240, the second UE (e.g., UE 307) sending a second electronic identifier associated with the second UE (e.g., UE 307), and, at step 1250, the second UE (e.g., UE 307), or user (e.g., user D) of the second UE (e.g., UE 307), indicating a second perceivable cue associated with the second identifier. The second UE (e.g., UE 307) may send the second electronic identifier in response to the first UE (e.g., UE 303) offering the perceivable cue.

Figure 13:
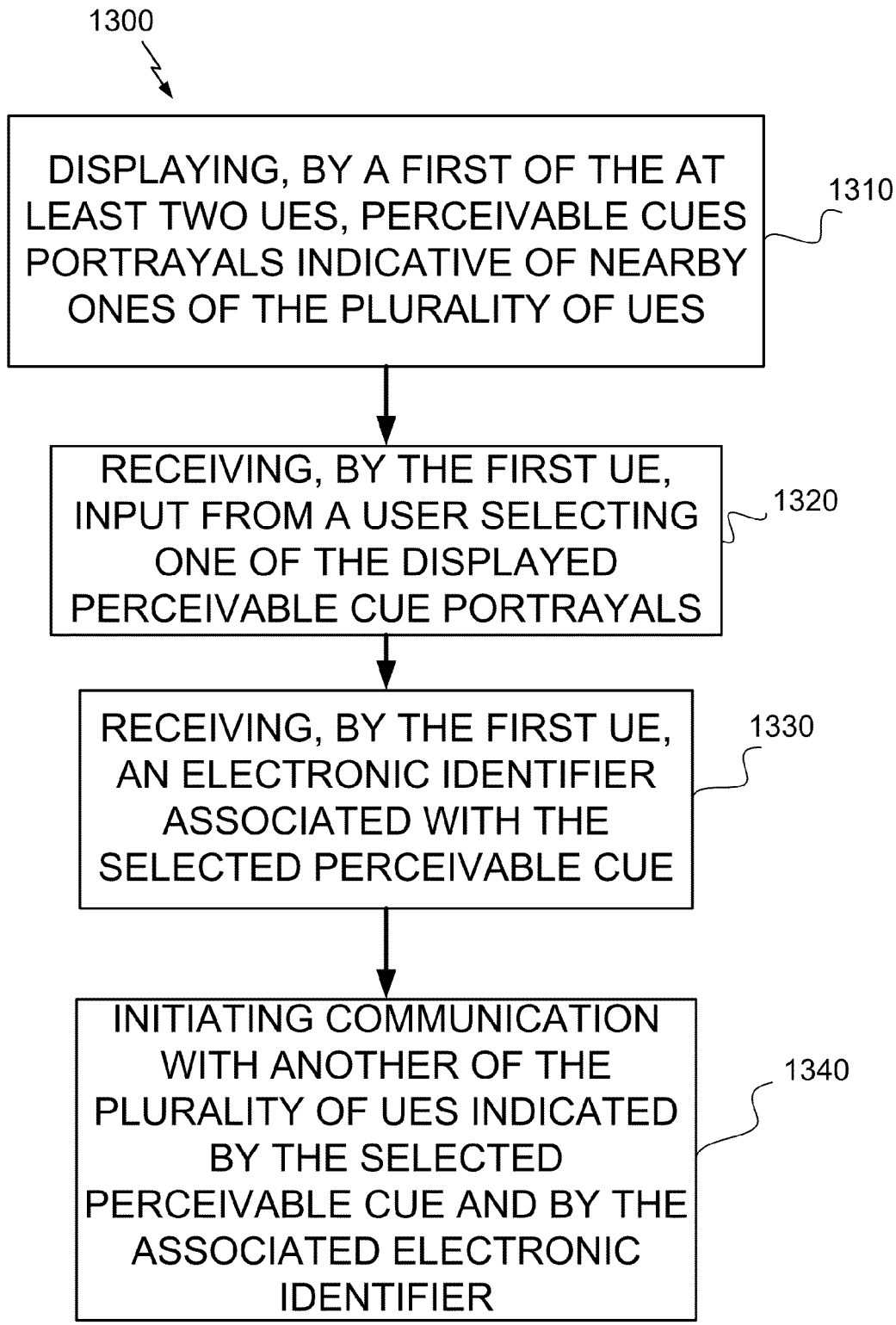
FIG. 13 shows a process for associating electronic identifiers of UEs with users of UEs according to an embodiment of the present disclosure.

In yet another embodiment of the present disclosure, illustrated with reference to FIG. 13, there is shown a methodology 1300 for establishing communication between at least two UEs (e.g., UE 303 and UE 307) of a plurality of UEs, which methodology 1300 is operable by a network entity (e.g., a UE 303). The method may involve, at step 1310, a first of the at least two UEs (e.g., UE 303) displaying perceivable cue portrayals indicative of nearby ones of the plurality of UEs. The method may involve, at step 1320, the first UE (e.g., UE 303) receiving input from a user (e.g., user B) selecting one of the displayed perceivable cue portrayals. At step 1330, the method may involve the first UE (e.g., UE 303) receiving an electronic identifier associated with the selected perceivable cue. The electronic identifier may be associated with the selected perceivable cue via peer discovery, for example. At step 1340, the method may involve the first UE (e.g., UE 303) initiating communication with another of the plurality of UEs indicated by the selected perceivable cue and by the associated electronic identifier.

Figure 14:
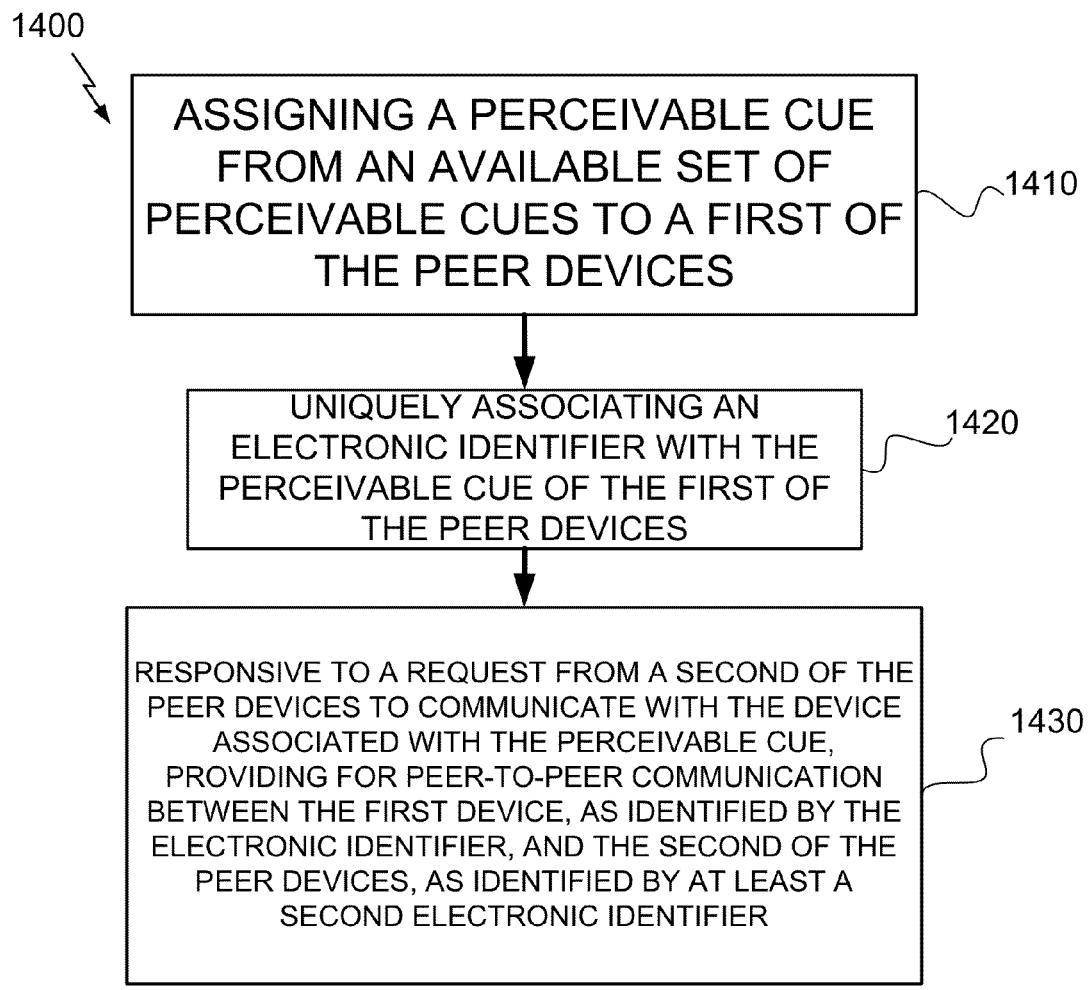
FIG. 14 shows a process for connecting peer devices in a geographical area, which is operable by a central server and/or a network communications hub, according to an embodiment of the present disclosure.

In still another embodiment of the present disclosure, illustrated with reference to FIG. 14, there is shown a methodology 1400 for connecting peer devices in a geographical area which methodology is operable by a network entity (e.g. a central server and/or a network communications hub 315). The method may involve, at step 1410, a network entity (e.g. network communications hub 315) assigning a perceivable cue from an available set of perceivable cues to a first of the peer devices. It should be appreciated that a user may not need to select from a list of preapproved cues assigned by a network entity. Rather, a user may submit his or her own cue to the network communications hub 315. The method may involve, at step 1420, the network entity (e.g. network communications hub 315) uniquely associating an electronic identifier with the perceivable cue of the first of the peer devices. Responsive to a request from a second of the peer devices to communicate with the device associated with the perceivable cue, the method 1400 may involve the network entity (e.g. network communications hub 315) providing, at step 1430, for peer-to-peer communication between the first device, as identified by the electronic identifier, and the second of the peer devices, as identified by at least a second electronic identifier.

Figure 15:
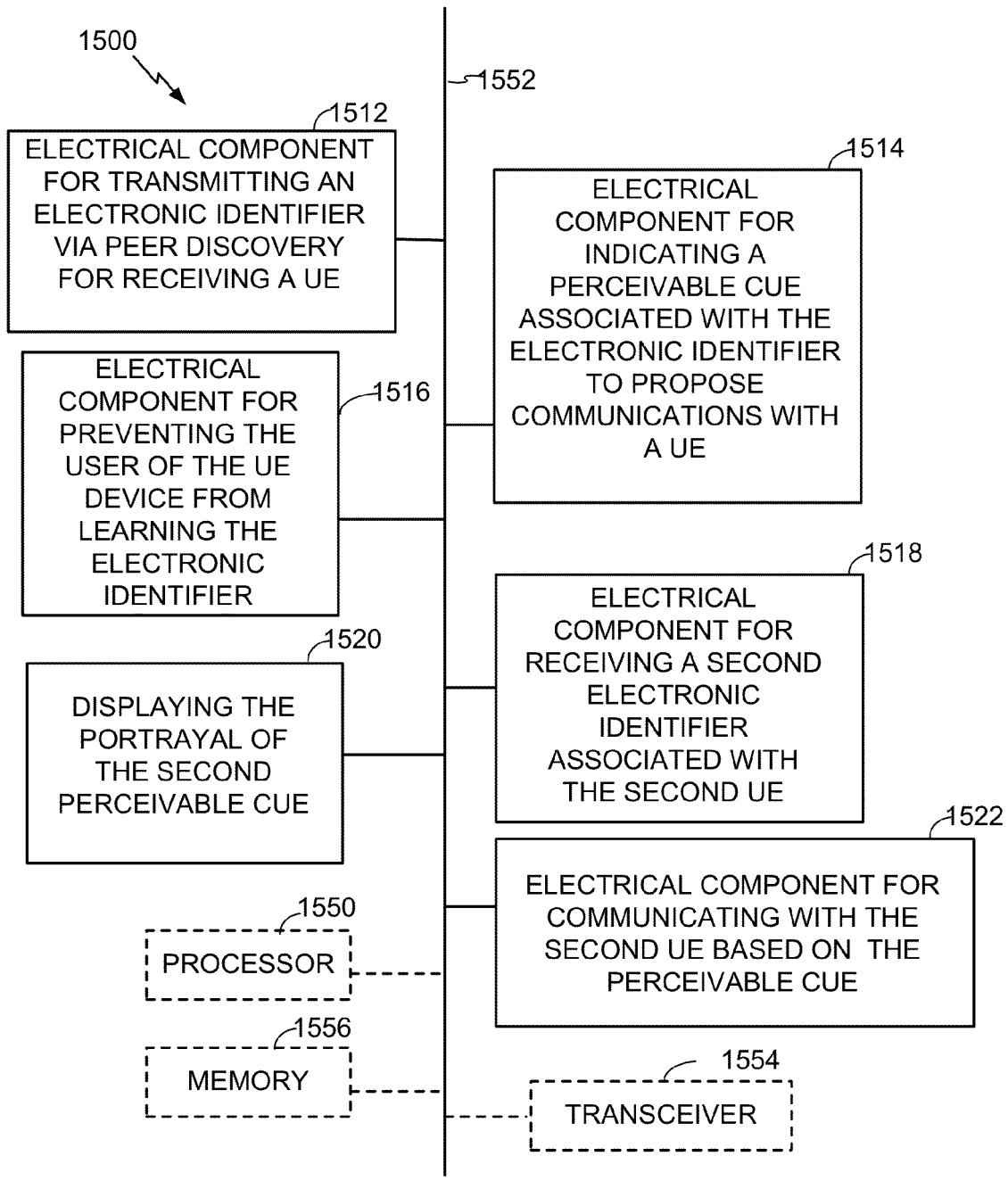
FIG. 15 shows an embodiment of an apparatus for connecting peer devices according to an embodiment of the present disclosure.

With reference to FIG. 15, there is provided an exemplary apparatus 1500 that may be configured as a network entity (e.g., UE or network communications hub) in a wireless network, or as a processor or similar device/component for use within the network entity. The apparatus 1500 may include functional blocks that can represent functions implemented by function-specific hardware (e.g., an ASIC, programmed gate array, programmed FPGA, etc.), a processor, program instructions (e.g., software, firmware), or a combination thereof. For example, apparatus 1500 may include an electrical component or module 1512 (e.g., transmitter 214 of UE 120*x*) for transmitting an electronic identifier of the apparatus 1500 (e.g., via peer discovery) for receiving by a second UE. The apparatus 1500 may also include an electrical component or module 1514 (e.g., a display of the UE 120*x*) for indicating, to a second user of the second UE, a portrayal of a perceivable cue associated with the electronic identifier of the apparatus 1500 to thereby propose communications with the second UE. The apparatus 1500 may also include an electrical component or module 1516 (e.g., the active set determination module 220 of the UE 120*x*) for preventing the second user of the UE device from learning the electronic identifier. Electrical component or module 1518 (a receiver 212 of UE 120*x*, for example) for receiving, from the second UE that is part of the UEs active set (such as may be determined by active set determination module 220 of UE 120*x*, for example), a second electronic identifier associated with the second UE, as well as for receiving an indication of a second perceivable cue associated with the second identifier. The apparatus 1500 may also include an electrical component or module 1520 (a display 232 of UE 120*x*, for example) for displaying the portrayal of the second perceivable cue). The apparatus 1500 may also include an electrical component or module 1522 (the receiver 212 of UE 120*x*, for example) for communicating with the second UE based on the perceivable cue.

Figure 16:
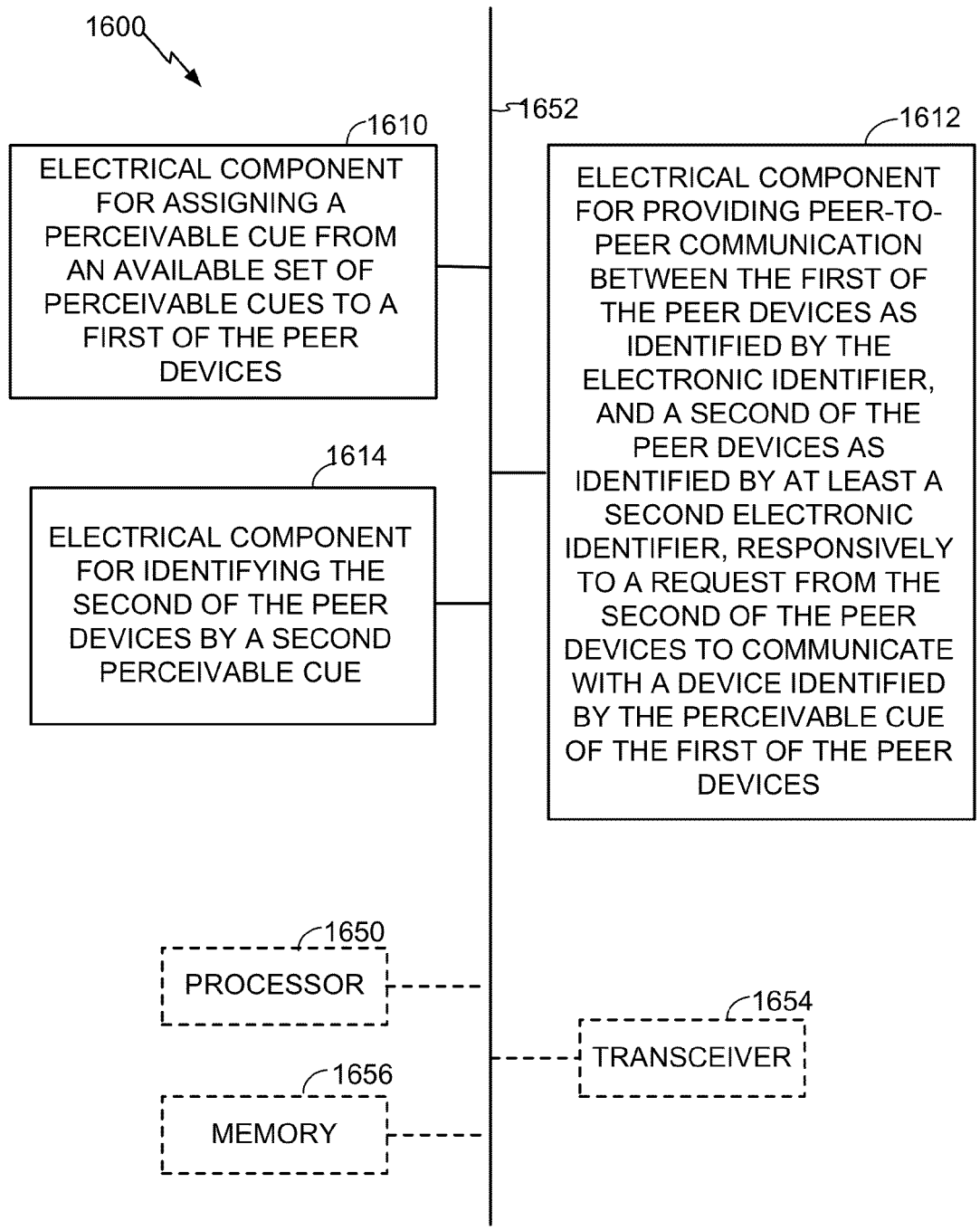
FIG. 16 shows an embodiment of an apparatus for communicating with at least a second UE having a second electronic identifier according to an embodiment of the present disclosure.

With reference to FIG. 16, there is provided an exemplary apparatus 1600 that may be configured as a network entity (e.g. a network communications hub) in a wireless network, or as a processor or similar device/component for use within the network entity. The apparatus 1600 may include functional blocks that can represent functions implemented by function-specific hardware (e.g., an ASIC, programmed gate array, programmed FPGA, etc.), a processor, program instructions (e.g., software, firmware), or a combination thereof. For example, apparatus 1600 may include an electrical component or module 1610 (a sensing module 217 of network communications hub 110*x*, for example) for assigning a perceivable cue from an available set of perceivable cues to a first of the peer devices. Module 1610 may also be for uniquely associating an electronic identifier with the perceivable cue of the first of the peer devices. The apparatus may also include an electrical component or module 1612 (a transmitter 215 of network communications hub 110*x*, for example) for providing for peer-to-peer communication between the first of the peer devices as identified by the electronic identifier, and a second of the peer devices as identified by at least a second electronic identifier, responsively to a request (such as to receiver 213 of network communications hub 110*x*) from the second of the peer devices to communicate with a device identified by the perceivable cue of the first of the peer devices. Electrical component or module 1614 (a transmitter 215 of network communications hub 110*x*, for example) may be for identifying the second of the peer devices by a second perceivable cue.

In related aspects, apparatus 1500 and 1600, may optionally include processor components 1550 and 1650 respectively, which may be in operative communication with the components 1512-1522 and 1610-1614, respectively, via buses 1552 and 1652, respectively, or via similar communication coupling. The processors 1550 and 1650 may effect initiation and scheduling of the processes or functions performed by electrical components 1512-1522 and 1610-1614.

In other related aspects, the apparatus described herein may include a radio transceiver component 1554 and 1654. A stand alone receiver and/or stand alone transmitter may be used in lieu of or in conjunction with these transceivers 1554, 1654, 1754, or 1854. When the apparatus 1500 and 1600 is a UE or similar network entity, that apparatus may also include a network interface (not shown) for connecting to one or more core network entities. Each of these apparatus 1500 and 1600 may optionally include a component for storing information, such as, for example, a memory device/component 1556 and 1656. The computer readable medium or the memory component 1556 and 1656 may be operatively coupled to the other components of the apparatus 1500 and 1600 such as via the bus 1552 and 1652 or the like. The memory component 1556 and 1656 may be adapted to store computer readable instructions and data for affecting the processes and behavior of the components described in each of the apparatus, and subcomponents thereof, or the processors, or the methods disclosed herein. The memory components described herein may retain instructions for executing functions associated with the components each of the components of each of the apparatus. While shown as being external to the memory components, it is to be understood that each of the components can exist within the respective memory components. It is further noted that the components in FIGS. 15-16 may comprise processors, electronic devices, hardware devices, electronic sub-components, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium, and preferably on a non-transitory computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A method of associating an electronic identifier of a user equipment (UE) with a user of the UE, the method comprising:
    the UE transmitting the electronic identifier associated with the UE to a second UE; and
    indicating a perceivable cue associated with the electronic identifier to a second user of the second UE.

2. The method of claim 1, wherein indicating a perceivable cue associated with the electronic identifier to a second user of the second UE includes the UE transmitting a message providing information from which the second UE can create a portrayal, on its screen, of the perceivable cue associated with the electronic identifier, said perceivable cue enabling identification of the UE.

3. The method of claim 2, further comprising:
    operating the UE to present the perceivable cue, said presenting including the UE generating one of a visual output, an audible output or a tactile output.

4. The method of claim 1, further comprising preventing the second user of the second UE from learning the electronic identifier.

5. The method of claim 1, wherein the transmitting comprises transmitting the electronic identifier associated with the UE to the second UE via peer discovery.

6. The method of claim 1, wherein the perceivable cue comprises a visual cue.

7. The method of claim 1, wherein the perceivable cue comprises an audible cue.

8. The method of claim 1, further comprising:
    the UE receiving, from the second UE, a second electronic identifier associated with the second UE; and
    the user receiving an indication of a second perceivable cue associated with the second identifier.

9. The method of claim 8, further comprising:
    the UE displaying a portrayal of the second perceivable cue to the user;
    receiving an input from the user indicating a desire to communicate with a user of the second UE in response to the displaying of the portrayal of the second perceivable cue and the receiving of the indication of the second perceivable cue; and
    enabling the user to communicate with a user of the second UE using the second electronic identifier in response to the receiving of the input from the user.

10. The method of claim 9, wherein the received communication uses a third electronic identifier, and wherein the third electronic identifier is based on the first and second electronic identifiers.

11. The method of claim 1, wherein the perceivable cue is recognizable by a human at a distance from the UE, the method further comprising:
    communicating with the second UE correspondent to acceptance by the second UE of the human perceivable cue.

12. A method of communicating with a user equipment (UE) of a first user having a unique first electronic identifier, comprising:
    a second UE receiving the unique first electronic identifier associated with the UE;
    the second UE receiving input based on the first user selecting a portrayal of a perceivable cue associated with the unique first electronic identifier; and
    the second UE communicating with the UE based on a selecting of the portrayal of the perceivable cue.

13. The method of claim 12, further comprising preventing a second user of the second UE from learning the unique first electronic identifier.

14. The method of claim 12, wherein said receiving the unique first electronic identifier comprises receiving the unique first electronic identifier during peer discovery.

15. The method of claim 12, wherein the perceivable cue is recognizable by a human at a distance from the UE; and
    wherein the perceivable cue comprises a visual cue.

16. The method of claim 12, wherein the perceivable cue comprises an audible cue.

17. The method of claim 12, further comprising:
    the second UE sending a second electronic identifier associated with the second UE; and the second UE indicating a second perceivable cue associated with the second identifier.

18. The method of claim 17, wherein the second UE communicating is responsive to the first user of the first UE selecting a portrayal of the second perceivable cue displayed on the first UE.

19. The method of claim 12, wherein the second UE communicating with the UE is based on a selecting of the portrayal of the perceivable cue and the electronic identifier according to the electronic identifier.

20. The method of claim 19, wherein the association is via the peer discovery channel.

21. A method of connecting peer devices in a geographical area comprising:
    assigning a perceivable cue from an available set of perceivable cues to a first of the peer devices;
    uniquely associating an electronic identifier with the perceivable cue of the first of the peer devices;
    responsive to a request from a second of the peer devices to communicate with a device identified by the perceivable cue of the first of the peer devices, providing for peer-to-peer communication between the first device as identified by the electronic identifier, and the second of the peer devices as identified by at least a second electronic identifier.

22. The method of claim 21,
    wherein the perceivable cue is recognizable by a human at a distance from the first of the peer devices; and
    wherein the second of the peer devices is further identified by a second perceivable cue.

23. A first user equipment (UE) having an electronic identifier, comprising:
    means for transmitting the electronic identifier for receiving by a second UE; and
    means for indicating to a second user of the second UE of a perceivable cue associated with the electronic identifier to propose communications with the second UE.

24. The first UE of claim 23, further comprising means for preventing the second user of the second UE from learning the electronic identifier.

25. The first UE of claim 23, wherein the perceivable cue comprises a visual cue.

26. The first UE of claim 23, wherein the perceivable cue comprises an audible cue.

27. The first UE of claim 23, wherein the perceivable cue is recognizable by a human at a distance from the first UE, the first UE further comprising:
    means for communicating with the second UE, based on acceptance by the second UE of the proposal to communicate.

28. The first UE of claim 23, further comprising:
    means for:
    receiving, from the second UE, a second electronic identifier associated with the second UE; and
    receiving an indication of a second perceivable cue associated with the second identifier.

29. The first UE of claim 28, further comprising:
    means for receiving a communication from the second UE, based on the second perceivable cue.

30. A first user equipment (UE) having a first electronic identifier for communicating with at least a second UE having a second electronic identifier, comprising:
    means for receiving the second electronic identifier;
    means for receiving a perceivable cue associated with the second electronic identifier; and
    means for communicating with the second UE based on a selecting of the perceivable cue.

31. A user equipment (UE) capable of peer-to-peer communication with at least one second UE, comprising:
    means for displaying portrayals of perceivable cues indicative of the at least one second UE
    means for receiving input from a user selecting one of the perceivable cues;
    means for receiving an electronic identifier associated with the selected perceivable cue; and
    means for initiating communication with the at least one second UE indicated by the selected perceivable cue and by the electronic identifier.

32. A network communications hub for connecting peer devices in a geographical area, comprising:
    means for:
    assigning a perceivable cue from an available set of perceivable cues to a first of the peer devices; and
    uniquely associating an electronic identifier with the perceivable cue of the first of the peer devices;
    means for providing for peer-to-peer communication between the first of the peer devices as identified by the electronic identifier, and a second of the peer devices as identified by at least a second electronic identifier, responsively to a request from the second of the peer devices to communicate with a device identified by the perceivable cue of the first of the peer devices.

33. The network communications hub of claim 32, wherein the perceivable cue is recognizable by a human at a distance from the first of the peer devices, the network hub further comprising means for identifying the second of the peer devices by a second perceivable cue.

34. A computer program product, comprising:
    a non-transitory computer-readable medium associated with a first user equipment (UE), comprising:
    code for causing at least one processor to direct a transmission of an
    electronic identifier uniquely associated with the first UE; and
    code for causing the at least one processor to direct an indication to a second user of the second UE of a perceivable cue associated with the electronic identifier to propose communications with the second UE.

35. The computer program product of claim 34, code for preventing the second user of the second UE from learning the electronic identifier.

36. The computer program product of claim 34,
    wherein the perceivable cue is recognizable by a human at a distance from the first UE; and
    wherein the perceivable cue comprises a visual cue.

37. The computer program product of claim 34, wherein the perceivable cue comprises an audible cue.

38. The computer program product of claim 34, further comprising:
    code for causing the at least one processor to direct communication with the second UE, based on acceptance by the second UE of the proposal to communicate.

39. A computer program product, comprising:
    a non-transitory computer-readable medium associated with a first user equipment (UE) having a first electronic identifier, comprising:
    code for causing at least one processor to direct receiving of a second electronic identifier associated with a second UE;
    code for causing the at least one processor to direct receiving of a perceivable cue associated with the second electronic identifier; and code for causing the at least one processor to direct communication with the second UE based on a selecting of the perceivable cue.

40. A computer program product, comprising:
a non-transitory computer-readable medium associated with a first user equipment (UE) having a first electronic identifier, comprising:
code for causing at least one processor to direct displaying of perceivable cues indicative of at least one second UE
code for causing the at least one processor to receive input from a user selecting one of the portrayals of perceivable cues;
code for causing the at least one processor to receive an electronic identifier associated with the selected perceivable cue; and
code for causing the at least one processor to direct initiating communication with the at least one second UE indicated by the selected perceivable cue and by the electronic identifier.

41. A computer program product, comprising:
a non-transitory computer-readable medium associated with a network communications hub for connecting peer devices in a geographical area, comprising:
code for causing at least one processor to assign a perceivable cue from an available set of perceivable cues to a first of the peer devices;
code for causing the at least one processor to uniquely associate an electronic identifier with the perceivable cue of the first of the peer devices;
code for causing the at least one processor to provide for peer-to-peer communication between the first of the peer devices as identified by the electronic identifier, and a second of the peer devices as identified by at least a second electronic identifier, responsively to a request to from the second of the peer devices to communicate with a device identified by the perceivable cue of the first of the peer devices.

42. A first user equipment (UE) having a first electronic identifier and for associating a second electronic identifier of at least one second UE with at least one second user, comprising:
a transmitter configured to transmit the first electronic identifier;
a receiver configured to receive the second electronic identifier;
a display configured to display, in association with the second electronic identifier, a perceivable cue indicated by the at least one second user;
an active set determination module configured to associate the received at least one second electronic identifier with the displayed perceivable cue; and
a communications module configured to, upon indication to communicate with the at least one second UE indicated by the displayed perceivable cue, initiate communication with the at least one second UE via a communicative connection indicated by the first electronic identifier and the second electronic identifier.

43. The first UE of claim 42, wherein the communication comprises peer-to-peer communication.

44. The first UE of claim 42, wherein the communication comprises WAN communication.

45. The first UE of claim 42, wherein the perceivable cue is recognizable by a human at a distance from the second UE; and
wherein the perceivable cue comprises a visual cue.

46. The first UE of claim 42, wherein the perceivable cue comprises an audible cue.

47. A first user equipment (UE) having a first electronic identifier and for associating a second electronic identifier of at least one second UE with at least one second user, comprising:
a display configured to display a plurality of portrayals of perceivable cues indicative of other UEs in a geographical area;
an actuator configured to receive input from a user selecting one of the perceivable cues;
a receiver configured to receive an electronic identifier associated with the selected perceivable cue; and
a communications module configured to communicate with the at least one second UE indicated by the selected perceivable cue and by the electronic identifier.

48. The first UE of claim 47, wherein the perceivable cues are recognizable by a human at a distance; and
wherein the perceivable cue comprises a visual cue.

49. The first UE of claim 47, wherein the perceivable cue comprises an audible cue.

50. A network communications hub for connecting peer devices in a geographical area, comprising:
a first aspect of a server configured to assign a perceivable cue from an available set of perceivable cues to a first of the peer devices;
a second aspect of a server configured to uniquely associate an electronic identifier with the perceivable cue of the first of the peer devices; and
a resource allocation module configured to provide for peer-to-peer communication between the first of the peer devices as identified by the electronic identifier, and a second of the peer devices as identified by at least a second electronic identifier, responsively to a request to from the second of the peer devices to communicate with a device identified by the perceivable cue of the first of the peer devices.

\* \* \* \* \*